United States Patent [19]
Heller et al.

[11] Patent Number: 5,991,866
[45] Date of Patent: Nov. 23, 1999

[54] METHOD AND SYSTEM FOR GENERATING A PROGRAM TO FACILITATE REARRANGEMENT OF ADDRESS BITS AMONG ADDRESSES IN A MASSIVELY PARALLEL PROCESSOR SYSTEM

[75] Inventors: Steven K. Heller, Watertown; Andrew Shaw, Somerville, both of Mass.

[73] Assignee: TM Patents, LP, Boston, Mass.

[21] Appl. No.: 08/255,304

[22] Filed: Jun. 7, 1994

Related U.S. Application Data

[63] Continuation of application No. 07/857,545, Mar. 25, 1992, abandoned.

[51] Int. Cl.$^6$ .................................................. G06F 15/16
[52] U.S. Cl. ............................... 712/10; 712/14; 712/16; 712/12
[58] Field of Search ............................................. 395/800

[56] References Cited

U.S. PATENT DOCUMENTS

| | | | |
|---|---|---|---|
| 3,699,535 | 10/1972 | Klein | 395/800 |
| 4,720,780 | 1/1988 | Dolecek | 364/DIG. 1 |
| 4,907,148 | 3/1990 | Morton | 364/DIG. 1 |
| 5,230,079 | 7/1993 | Grondalski | 395/800 |
| 5,237,691 | 8/1993 | Robinson et al. | 395/700 |
| 5,243,699 | 9/1993 | Nickolls et al. | 395/275 |
| 5,247,632 | 9/1993 | Newman | 395/400 |
| 5,367,692 | 11/1994 | Edelman | 395/800 |

OTHER PUBLICATIONS

*Journal of Parallel and Distributed Computing*, "Optimal Matrix Transposition and Bit Reversal on Hypercubes : All–To–All Personalized Communication," By Edelman, Copyright 1991.

*Primary Examiner*—Meng-Ai T. An
*Assistant Examiner*—Walter D. Davis, Jr.
*Attorney, Agent, or Firm*—Cesari and McKenna, LLP

[57] ABSTRACT

A system and method for generating a program to enable reassignment of data items among processors in a massively-parallel computer to effect a predetermined rearrangement of address bits. The computer has a plurality of processing elements, each including a memory. Each memory includes a plurality of storage locations for storing a data item, each storage location within the computer being identified by an address, comprising a plurality of address bits having a global portion comprising a processing element identification portion and a local portion identifying the storage location within the memory of the particular processing element. The system generates a program to facilitate use of a predetermined set of tools to effect a reassignment of data items among processing elements and storage location to, in turn, effect a predetermined rearrangement of address bits. The system includes a global processing portion and a local processing portion. The global processing portion generates a global program portion to enable use of the tools to effect a reassignment of data items as among said processing elements to, in turn, effect a rearrangement of the global portion of said address bits. The local processing portion generates a local program portion to enable use of the tools to effect a reassignment of data items as among storage locations within said processing elements to, in turn, effect a rearrangement of the local portion of said address bits.

14 Claims, 7 Drawing Sheets

METHOD AND SYSTEM FOR GENERATING A PROGRAM TO FACILITATE REARRANGEMENT OF ADDRESS BITS AMONG ADDRESSES IN A MASSIVELY PARALLEL PROCESSOR SYSTEM

This is a continuation of application Ser. No. 07/857,545, filed on Mar. 25, 1992, now abandoned.

INCORPORATION BY REFERENCE

U.S. patent application Ser. No. 07/520,701, filed May 8, 1990 now U.S. Pat No. 5,247,613, in the name of H. Mark Bromley, entitled Massively Parallel Processor Including Slice-Wise Communications Arrangement, assigned to the assignee of the present application, incorporated by reference.

U.S. patent application Ser. No. 07/534,598, filed Jun. 6, 1990 now abandoned, in the name of Steven K. Heller, et al., entitled Massively Parallel Processor Including Queue-Based Message Delivery System, assigned to the assignee of the present application, incorporated by reference.

U.S. patent application Ser. No. 07/707,366, filed May 30, 1991, now U.S. Pat. No 5,367,692, in the name of Alan S. Edelman, entitled Massively Parallel Processor Including All-To-All Personalized Communication Arrangement, assigned to the assignee of the present application, incorporated by reference.

FIELD OF THE INVENTION

The invention relates generally to the field of multi-processor and parallel computer systems.

BACKGROUND OF THE INVENTION

To increase processing speed, computer systems have been developed including a plurality of processors operating generally concurrently on one or several programs. Various types of such multiple-processor computer systems have been developed. In one type of system, generally identified as "SIMD" (single instruction stream/multiple data stream), all of the processors are controlled in tandem, and generally in lockstep, by a host computer. A typical SIMD system is described in U.S. Pat. No. 4,598,400, issued Jul. 1, 1986, to W. Daniel Hillis, for Method and Apparatus For Routing Message Packets (hereinafter the "400 patent") and assigned to the assignee of the present application. In the system described in the '400 patent, the host computer broadcasts instructions to the processors, which execute them in parallel on their separate streams of data. The various processors in the system described in the '400 patent are interconnected by a routing network, which permits them to transfer messages, including data, also in parallel under control of the host computer. In a typical SIMD system, the processors operate in synchronism, with the synchronization of the processors being maintained through the issuance of the instructions by the host computer.

Another type of multiple-processor system, generally identified as "MIMD" (multiple instruction stream/multiple data stream), may not have an explicit host computer or central point of control. Instead, the processors execute their own individual programs, comprising separate instruction streams, on their individual data streams. The processors in a MIMD system are typically interconnected by a router over which each processor can exchange information, generally in the form of messages addressed to one or more of the other processors. If the system does not have a central point of control, the processors can synchronize by exchanging messages.

Recently, hybrids of the SIMD and MIMD systems have been developed in which the processors may be loosely controlled by commands from a host computer. In response to a command in such "S/MIMD" (synchronous MIMD) or "M/SIMD" (multiple SIMD) systems, the processors may execute one or a series of instructions on their individual items of data, with the particular series of instructions depending on, inter alia, the processors' individual programming and the results of their processing in response to previous commands.

Multiple-processor computer systems are also generally designed around two diverse memory models, namely, a shared memory model and a distributed memory model. In a shared memory model, memory, which stores data to be processed by the processors, is connected to all of the processors on a substantially equal basis. Typically, the processors are connected to a common memory through a memory access network. Which generally permits each processor to have access to memory on an equal basis. In a distributed memory model, each processor has an associated memory which stores data that the processor will be processing at any particular point in the program. The processor/memory combinations, generally termed herein "processing elements," are interconnected by a routing network to permit data to be transferred there among as may be required by the program. An example of a routing network is described in the aforementioned '400 patent. A particular multiple-processor system may be designed as a hybrid of these models, in which some portion of the memory may be assigned to each processor, either as a cache or as system memory.

In a computer system, each memory location for storing a data item is identified by an address comprising a plurality of address bits. In a parallel computer system, each address may further include a plurality of high-order bits which essentially comprises a processor identifier, which identifies the processor in whose memory the storage location is located. In some multiple-processor computer systems, such as disclosed in the aforementioned '400 patent, the processors may also be divided into a plurality of processor nodes, each of which includes a predetermined number of processors. In that case, the address bits for a particular storage location comprise a high-order portion identifying a particular processor node, an intermediate portion identifying a processor within the processor node, and a low-order portion identifying a particular storage location in that processor's memory.

In processing many types of programs on, in particular, systems designed according to the distributed memory model, it is often necessary to first assign data to processors in a particular pattern, or geometry. At various points in a program, it may be desirable, or even necessary, to change the pattern by which the data is assigned to the respective processors, as well as the pattern by which the data is stored within the respective processors' memories. The assignment pattern is generally determined by the programmer, either explicitly or implicitly in the program. The programmer may change the data assignment pattern as needed to enhance the processing speed of the program. Such reassignments typically involve rearrangements of selected ones of the address bits.

An example of such a reassignment is a matrix transpose. In a matrix, each matrix element is identified by an element identifier $(a_M, \ldots, a_N, a_{N-1}, \ldots a_0)$, where "$a_M, \ldots, a_N$" represents a series of bits that identify the column of the matrix element, and "$a_{N-1}, \ldots a_0$" represents a series of bits that identify the row of the matrix element. In a matrix transpose, the matrix elements are rearranged such that the rows and columns are interchanged, essentially flipping the matrix around its diagonal. When that occurs, the row and column portions of each element identifier are interchanged to $(a_{N-1}, \ldots a_0, a_M, \ldots, a_N)$. In one typical arrangment of a two-dimensional matrix on a parallel processor, the elements in various columns of the matrix are assigned to various ones of the processors. The memory associated with each processor stores elements in successive rows, in the column assigned to it, in successive storage locations. In that case, the column identifier portion of the element identifier, "$a_M, \ldots, a_N$" can also serve to identify the processor, and the row portion, "$a_{N-1}, \ldots, a_0$" the storage location, which stores a particular matrix element. In performing a transpose, the processor identifiers and storage location identifiers for each matrix element are interchanged, essentially meaning that the successive matrix elements stored by each processor are distributed to all of the processors, and each processor has a matrix element previously maintained by each of the processors. The aforementioned Edelman application describes an arrangement for performing such a transpose operation efficiently in a parallel processor in which the processing elements are interconnected by a routing network in the form of a hypercube.

SUMMARY OF THE INVENTION

The invention provides a new system and method for generating a program for controlling a computer system of the multiple-processor type to facilitate the reassignment of data items as among processing elements in a parallel processor to enable a predetermined rearrangement of address bits in addresses which identifying storage locations which store the respective data items.

In brief summary, the system and method generates a program to enable reassignment of data items among processors in a massively-parallel computer to effect a predetermined rearrangement of address bits. The computer has a plurality of processing elements, each including a memory. Each memory includes a plurality of storage locations for storing a data item, each storage location within the computer being identified by an address, comprising a plurality of address bits having a global portion comprising a processing element identification and a local portion identifying the storage location within the memory of the particular processing element. The system generates a program to facilitate use of a predetermined set of tools to effect a reassignment of data items among processing elements and storage location to, in turn, a predetermined rearrangement of address bits. The system includes a global processing portion and a local processing portion. The global processing portion generates a global program portion to enable use of said tools to effect a reassignment of data items as among said processing elements to, in turn, effect a rearrangement of the global portion of said address bits. The local processing portion generates a local program portion to enable use of said tools to effect a reassignment of data items as among storage locations within said processing elements to, in turn, effect a rearrangement of the local portion of said address bits.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
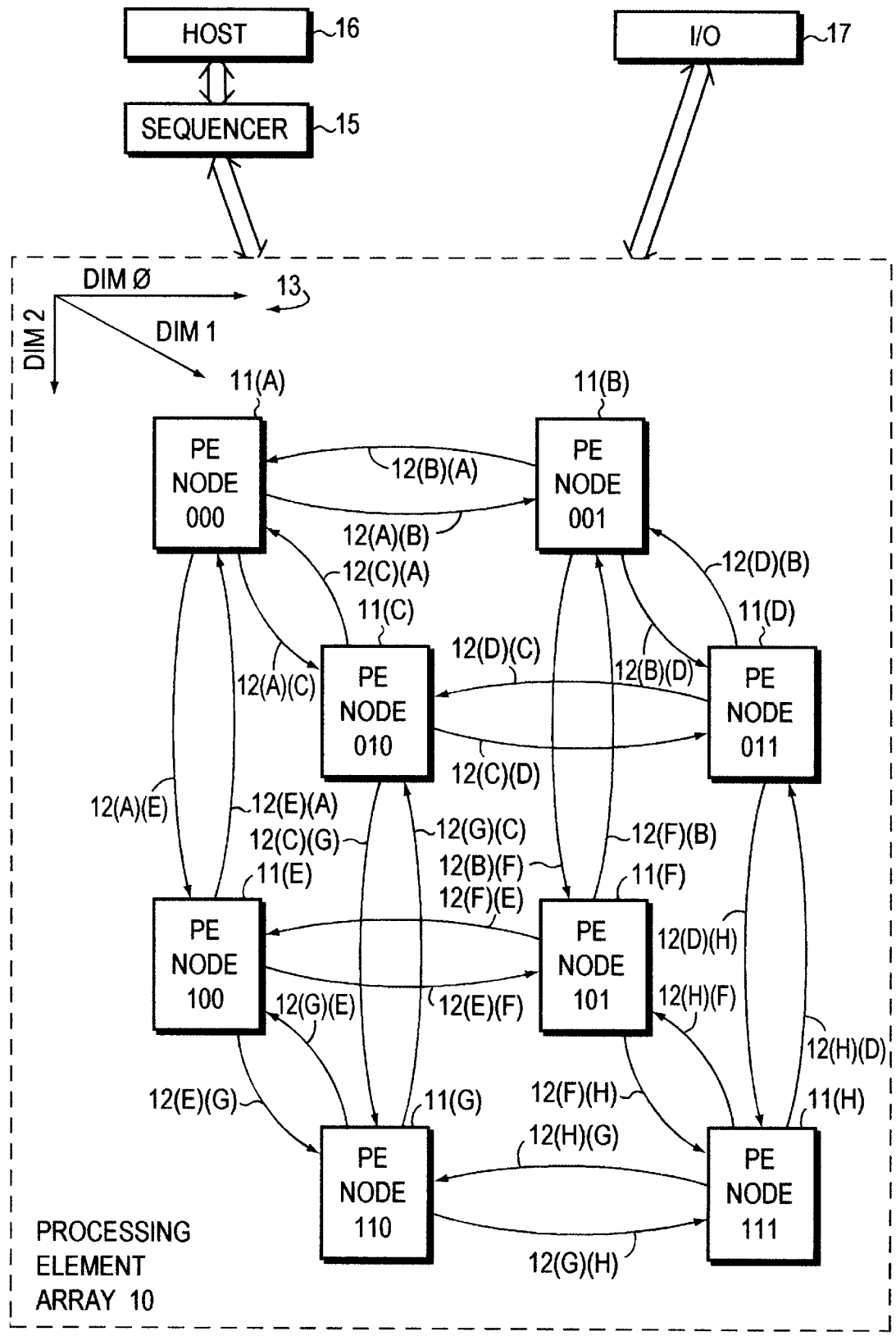
FIG. 1 is a diagram depicting a portion of a parallel computer system with which the invention can be used, including a plurality of processing element nodes interconnected by a hypercube router.
Figure 2:
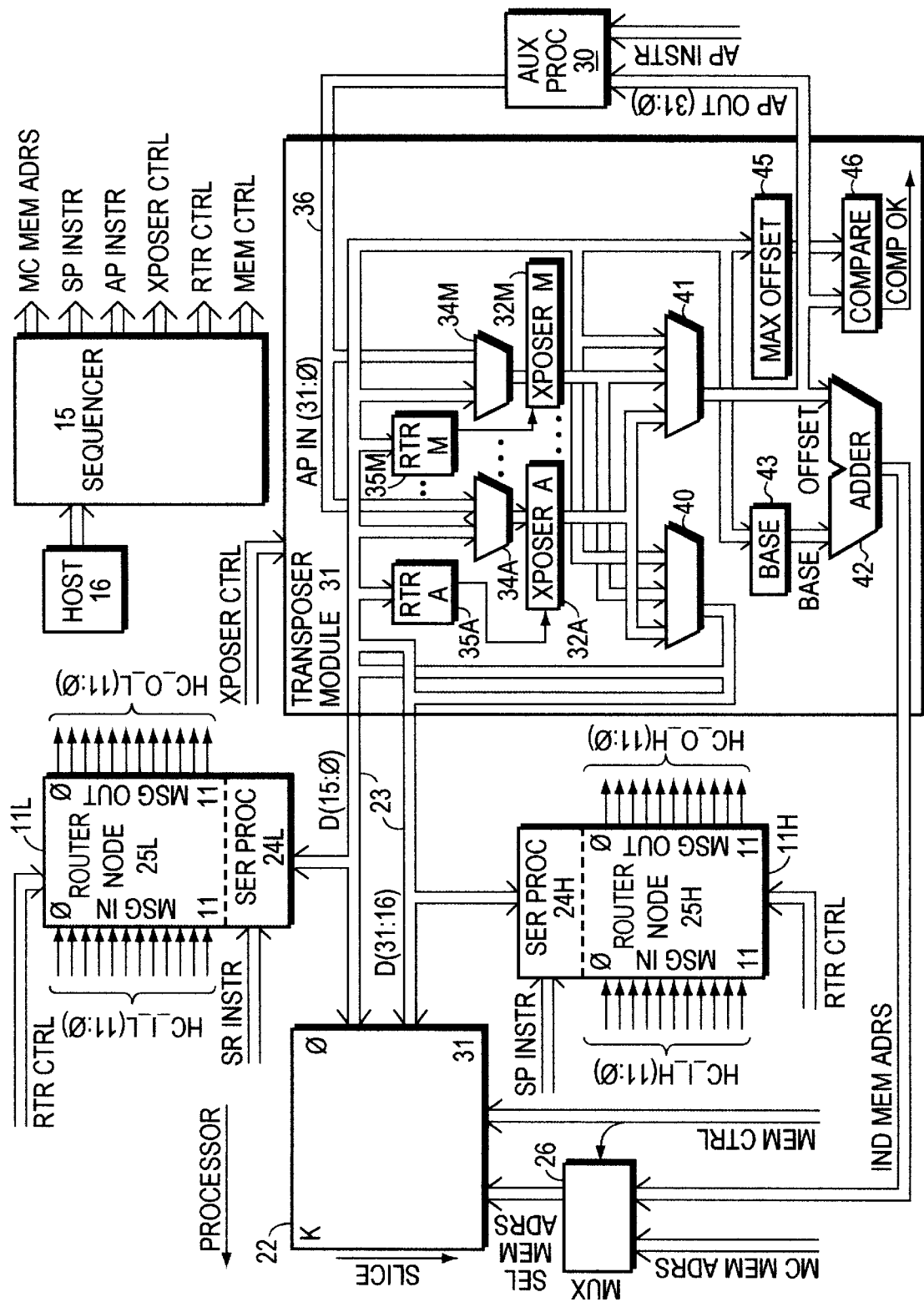
FIG. 2 is a diagram depicting details of a processing element node useful in the system depicted in FIG. 1.

The invention will be described in connection with a parallel computer having a structure generally shown in FIGS. 1 and 2. With reference to FIG. 1, which is adapted from FIG. 1 of the aforementioned Edelman application, the computer system includes a processing element array 10 comprising a plurality of processing element nodes, generally identified by reference numeral 11(x), interconnected by a plurality of communications links 12(x)(y). Eight processing element nodes 11(x) are shown in the processing element array 10 depicted in FIG. 1, identified by reference numerals 11(A) through 11(H), but it will be clear from the following that the processing element array 10 may include fewer, or many more, than eight processing element nodes 11(x). The structure of a processing element node 11(x) will be described in detail below in connection with FIG. 2; generally, in one embodiment a node 11(x) includes processing circuitry and communications link interface circuitry.

The communications links 12(x)(y) interconnect the processing element nodes 11(x) in the form of an "n"-dimensional hypercube. Each communications link 12(x)(y) transmits messages from one processing element node 11(x) (hereinafter referred to as a "source" processing element node) to another processing element node 11(y) (hereinafter referred to as a "destination" processing element node). In reference numeral 12(x)(y), the index "x" identifies the source processing element node 11(x) and the index "y" identifies the destination processing element node 11(y). As used herein, two processing element nodes 11(x) and 11(y) will be said to be "adjacent" if there is a pair of communications links 12(x)(y) and 12(j)(i) which interconnect them.

In the array 10 depicted in FIG. 1, the hypercube has three dimensions, as suggested by the grid 13 proximate processing element node 11(A). The hypercube used for array 10 may have any number of dimensions; in one particular embodiment, a processing element node 11(A) for which will be described in connection with FIG. 2 below, the hypercube has eleven dimensions. As is conventional in connection with hypercubes, the dimensionality of the hypercube and the number of processing element nodes are related, with the relation being that the number of dimensions corresponds to the logarithm, to the base two, of the number of processing element nodes in the hypercube. Since the eight processing element nodes 11(x) are shown in the processing element array 10 of FIG. 1, the processing element nodes 11(x) can be interconnected in a three-dimensional hypercube. It will be appreciated that the processing element array 10 may include many more processing element nodes 11(x) which may be interconnected by communications links 12(x)(y) to form a hypercube; preferably the number of processing element nodes 11(x) in the array 10 is a power of two, which facilitates interconnecting them in a regular hypercube having a number of dimensions corresponding to the logarithm, to the base two, of the number of processing element nodes.

The grid 13 has three arrows that are labeled "DIM 0," "DIM 1," and "DIM 2," each of which identifies one of the three dimensions DIM "i" in which "i" identifies the dimension. The directions of the hypercube dimensions, that is, the orientations of the particular communications links 12(x)(y) which correspond to the particular hypercube dimensions, differ for each processing element node 11(x), and is determined as follows. As shown on FIG. 1, each processing element node 11(x) is assigned a hypercube address, which is shown in binary form in FIG. 1. Each hypercube address has a number of binary digits corresponding to the number of dimensions in the hypercube. Thus, for example, processing element node 11(A) is assigned hypercube address "000," processing element node 11(B) is assigned hypercube address "001," and so on, with processing element node 11(H) being assigned hypercube address "111." The binary addresses are assigned to the processing element nodes 11(x) so that the binary addresses of adjacent processing element nodes differ in one bit location.

In each hypercube address, the right-most binary digit is the low-order digit in the hypercube address, with each successive digit towards the left being a progressively higher order digit, and the left-most binary digit being the high-order digit in the hypercube address. The dimension of the communications link 12(x)(y) interconnecting adjacent nodes corresponds to the order of the digit in the binary addresses that is different. Thus, as shown in FIG. 1, the binary addresses of processing element node 11(A) and processing element node 11(B) differ in the low (zeroth) order digit, and so the hypercube dimension from processing element node 11(A) to processing element node 11(B) is the DIM 0 dimension zero, as shown in grid 13. Similarly, the binary addresses of processing element node 11(A) and processing element node 11(C) differ in the next (first) order digit, and so the hypercube dimension from processing element node 11(A) to processing element node 11(C) is DIM 1 dimension one, also as shown in grid 13. Finally, the binary addresses of processing element node 11(A) and processing element node 11(E) differ in the high (second) order digit, and so the hypercube dimension from processing element node 11(A) to processing element node 11(E) is DIM 2 dimension two.

The hypercube dimensions from each processing element node 11(x) to its adjacent nodes are determined in a similar manner. It will be appreciated that, for the communications link 12(x)(y) from a processing element node 11(x) to another processing element node 11(y) that is associated with a particular dimension for the node 11(x), the communications link 12(j)(i) from the processing element node 11(y) to the processing element node 11(x) is associated with the same dimension. This is a result of the fact that the hypercube addresses of the processing element nodes 11(x) and 11(y), for each pair of adjacent nodes, will differ in the same order hypercube address bit, which order determines the dimension for each processing element node.

In one particular embodiment, the computer system also includes a sequencer 15, which is controlled by a host computer 16. To accomplish processing, the host computer 16, in response to a request from an applications or system program being processed thereby, transmits signals representing a command to the sequencer 15. In response to a command, the sequencer 15 may transmit a number of signals, as detailed below in connection with FIG. 2, to control the processing element nodes 11(x) of processing element array 10 in parallel. The processing element nodes 11(x) may also generate status signals, which they couple to the sequencer 15 to notify it of the status of the operations enabled by the sequencer. The sequencer 15 may also provide status signals to the host computer 16 to notify it of the status of the processing of the command. In addition, the computer system may include one or more input/output systems, generally identified by reference numeral 17. The input/output systems may include, for example, mass data storage devices, frame buffers, printers, or the like, which supply data to the processing element array 10 for processing, or which receive data therefrom for storage, display, and so forth.

The processing element nodes 11(x) of one embodiment of processing element array 10 are all similar, and so only node 11(A) will be described in detail. With reference to FIG. 2, which is adapted from FIG. 1 from both the aforementioned Bromley and Heller, et al., applications, processing element node 11(A) includes two processing element (PE) chips 21H and 21L (generally identified by reference numeral 21) connected to a memory 22 over a data bus 23. In one embodiment, the data bus includes thirty-two data lines D(31:0) which are divided into high-order data lines D(31:16), which connect to PE chip 21H, and low-order data lines D(15:0), which connect to PE chip 21L. Each PE chip 21 includes a set of serial processors, generally identified by reference numeral 24, and a router node, generally identified by reference numeral 25. The serial processors operate in response to SP INSTR serial processor instruction signals from the sequencer 15 to perform processing on data stored in the memory 22. The sequencer 15 may enable the serial processors 24(i) to emulate a larger number of virtual processors by essentially providing, in each memory 22, multiple sets of each item of data, one set associated with each virtual processor and providing the SP INSTR serial processor instruction signals multiple times to, in parallel, enable the serial processors 24(i) to process the sets seriatim.

The memory 22 operates in response to SEL MEM ADRS selected memory address signals, which identify storage locations in the memory 22, and MEM CTRL memory control signals which indicate whether data is to be stored in or transmitted from the location identified by the SEL MEM ADRS selected memory address signals. The SEL MEM ADRS selected memory address signals are provided by a multiplexer 26, which operates under control of the MEM CTRL memory control signals from the sequencer 15. The multiplexer 26 couples either MC MEM ADRS microcontroller memory address signals from the sequencer 15 or IND MEM ADRS indirect memory address signals to the memory 22 as the SEL MEM ADRS selected memory address signals. The router nodes 25 also operate in response to RTR CTRL router control signals, also from the sequencer 15, to transmit messages containing data from one processing element node 11 to another.

In one embodiment, each PE chip 21 includes sixteen serial processors 24, each of which is associated with one of the data lines of the data bus 23. That is, each serial processor 24(i) receives data bits from, and transmits data bits onto, one of the data lines D(i) ["i" is an integer from the set (31, . . . , 0)]. The memory 22 has storage locations into thirty-two bit slices, with each slice being identified by a particular binary-encoded encoded value of the SEL MEM ADRS selected memory address signals from the multiplexer 26. If data is to be transmitted from a slice in memory identified by a particular value of the SEL MEM ADRS selected memory address signals, the memory 22 will transmit bits 41 through 0 of the slice onto data lines D( 31) through D(0), respectively. On the other hand, if data is to be loaded into a slice in memory identified by a particular value of the SEL MEM ADRS selected memory address signals, the memory 22 will receive bits 31 through 0 of from data lines D(31) through D(0), respectively, and load them into respective bits of the slice.

To perform processing on multi-bit words of data in the memory 22 using the serial processors 24, the sequencer 15 iteratively enables generation of SEL MEM ADRS selected memory address signals whose values identify successive location in memory 22, and MEM CTRL memory control signals which enable the memory 22 to transmit or store slices of data, and SP INSTR serial processor instruction signals which enable the serial processors 24 to perform the required operations on the bits on their associated data lines D(i). The data in the memory 22 thus may be viewed in two ways, namely, (i) a slice view, identified by the arrow labeled "SLICE," representing fixed-size words of data ("data slices") that will be transmitted from the memory 22 onto the data bus 23, or that will be received by the memory 22 from the data bus 23, at one time in response to the MEM ADRS memory address signals, and (ii) a processor view, identified by the arrow labelled "PROCESSOR," which represents the organization in memory 22 of data which may be accessed by an individual serial processor. In the slice view, the size of a data word corresponds to the number of data lines, that is, thirty-two bits. In the processor view, a data word, which corresponds to a data value which may be manipulated during execution of a program, may be any number of data bits, although in one embodiment the number of bits is preferably a multiple of thirty-two. Generally, a serial processor 24 and associated memory, that is, the series of bits storage locations, provided by the series of slices in memory 22, will be referred to as a "processing element."

The router nodes 25 of all of the processing element nodes 11 are interconnected to facilitate transfer of messages among the processing element nodes 11 comprising the array. In one particular embodiment the router nodes are interconnected in the form of a hypercube, as described in the aforementioned Hillis patents. Each router node 25H and 25L, under control of RTR CTRL router control signals from the sequencer 15, transmits messages to other router nodes 25 on other processing element chips 21 over a plurality of communications links identified by reference numerals HC_O_H (11:0) and HC_O_L(11:0), respectively.

In addition, each router node 25H and 25L receives messages from communications links identified by reference numerals HC_I_H(11:0) and HC_I_L(11:0), respectively. The router nodes 25 determine from the address of each received message whether the message is intended for a serial processor 24(i) on the processing element node 11(A) and, if so, couples it onto a data line D(i) of data bus 23 over which the serial processor 24(i) that is to receive the message accesses the memory 22. The sequencer 15 enables generation of SEL MEM ADRS selected memory address and MEM CTRL memory control signals to facilitate the storage of the data from the message in the memory 22.

Each message includes at least a data field which includes the data to be transferred. The processing element nodes 11(x) can transfer data in two general transfer modes, including a regular transfer mode and a random transfer mode. In the regular transfer mode, all of the processing element nodes transfer data in parallel, with each processing element node, operating as a source processing element node 11(x) transferring data to a destination processing element node and 11(y) which is directly connected by a communication link 12(x)(y). The regular transfer mode may be used iteratively to transfer data to a final destination node which is not such a nearest neighbor of the original source processing element node. Since all of the processing element nodes 11 are performing such operations in parallel, this transfer mode may be used to perform regular data transfers along particular dimensions in a multi-dimensional grid, as described in U.S. Pat. No. 5,050,069, entitled "Method And Apparatus For Simulating M-Dimension Connecting Networks In An N-Dimension Network Where M Is Less Than N," issued Sep. 17, 1991, in the name of W. Daniel Hillis, et al., and assigned to the assignee of the present application. In such a transfer mode, the particular communication link selected for the data transfer depends on the number of dimensions in the hypercube, the number of dimensions in the multi-dimensional grid, and a Gray-encoding of the particular portions of the processing element node identifiers.

In the random transfer mode, each message further includes an address field. In the random message transfer mode, the address field of each message includes an address that identifies a processing element node 11 and processing element that is the intended recipient of the message. In addition, if each processing element is enabled to emulate a plurality of virtual processors, the address field will also provide the identification of a virtual processor. To deliver the message to the addressed processing element, the sequencer 15 enables the data from the message to be stored in processor format in memory 22. In enabling storage of the delivered message data, the sequencer 15 generates successive MC MEM ADRS sequencer memory address signals to identify successive locations in memory and MEM CTRL memory control signals that enable the multiplexer 26 to couple the MC MEM ADRS sequencer memory address signals to the memory 22 as SEL MEM ADRS selected memory address signals.

The various communications links HC_O_H(11:0), HC_O_L(11:0), HC_I_H(11:0) and HC_I_L(11:0) connected to each processing element node 10 are connected to diverse ones of other processing element nodes in a conventional manner to effect the hypercube interconnection. Thus, the outgoing communications links identified by reference numerals HC_O_H(11:0) and HC_O_L(11:0) correspond to various incoming communications links 12) at router nodes 25 of other processing element nodes 10. In one embodiment, the low-order outgoing communications link HC_O_H(0) and HC_O_L(0) of each PE chip 24 in the processing element node are connected to the incoming communication link HC_I_L(0) and HC_I_H(0) of the other PE chip on the same node, so that the remaining communications links effectively form an eleven-dimensional hypercube in relation to the processing element nodes. In addition, in one embodiment, the circuitry of the router nodes 25H and 25L is similar to that described in the aforementioned Hillis patents and Hillis, et al. patent application and will not be described further herein.

The router nodes 25, under control of the sequencer 15, perform message transfers in one or more message transfer cycles. That is, one message transfer operation, which may be initiated in response to a single message transfer command from the host 16, may require multiple message transfer cycles to complete. In each message transfer cycle, each processing element node 10 may transfer a message over each communications link connected thereto to another processing element node 10. For each message so transferred, if the destination serial processor 24(i) is not located on the receiving processing element node 10, that processing element node 10, during the current or a subsequent message transfer cycle, transfers the message over a communications link connected thereto to another processing element node 10.

On the other hand, if the destination serial processor 24(i) is located on the receiving processing element node 10, the router node 25 that receives the message will deliver the data in the message thereto during this or a subsequent message transfer cycle. That is, the router node 25 couples the data onto the data line D(i) associated with the destination serial processor and stores it in a temporary destination buffer 60 in memory 22. At some later point, the message will be transferred from the temporary destination buffer 60 for storage elsewhere in memory 22, which is identified by the sequencer 15 if the message transfer operation is in the direct mode, or by an address contained in the message if the message transfer operation is in the indirect mode, from which the data in the message may be processed by the serial processor 24(i). Eventually, all of the messages transferred during the message transfer operation will be in memory 22 and available to the respective destination serial processor(s) 24(i), at which point the message transfer operation will be finished.

The processing element nodes 10 may also have an auxiliary processor 30 that processes data in memory 22 that may be organized either in slice format or in processor format, and a transposer module 31 to interface the auxiliary processor 30 to the data bus 23. The auxiliary processor 30 may be, for example, a floating point processor, which may perform arithmetic and logic operations in connection with data in floating point data format. The auxiliary processors 30 and transposer modules 31 in the various processing element nodes 10 operate in response to AP INSTR auxiliary processor instruction signals and XPOSER CTRL transposer control signals, respectively, from the sequencer 15. As is the case with the other control signals provided by the sequencer 15, the sequencer 15 transmits the AP INSTR auxiliary processor instruction signals and the XPOSER CTRL transposer control signals to control the auxiliary processor 30 and transposer module 31 of all of the processing element nodes 10 concurrently, enabling them to generally perform the same operation concurrently.

The transposer module 31 includes several transposer circuits 32A through 32M (generally identified by reference numeral 32). Each transposer 32 receives input data from an input multiplexer 34 and stores it in one of a plurality of slots identified by the contents of a write pointer register 35. The register 35 may be provided with a pointer prior to storing each item of data in a slot in the associated transposer 32. Alternatively, the register may be loaded with an initial value before loading any data in the transposer 32 and then incremented for each successive item of data loaded therein. The input multiplexer 34, under control of the XPOSER CTRL transposer control signals, selectively couples data signals to the transposer 32 from either the data bus 23 or from a bus 36. Bus 36 carries AP IN (41:0) auxiliary processor in signals representing processed data from the auxiliary processor 30. The transposer module 31 also includes an input multiplexer 37 and write pointer register 38 which selectively controls storage of data in the transposer 33 in the same manner.

The transposers 32 and 33 operate in response to the XPOSER CTRL transposer control signals to generate transpositions of the data stored therein. The transposer module 31 also includes two output multiplexers 40 and 41, also controlled by the XPOSER CTRL transposer control signals, which control the transfer of transposed data onto a bus 42 for transmission to the auxiliary processor 30 or onto the data bus 23 for transmission to the memory 22 or to the PE chips 21. Multiplexer 40 receives data signals from the output terminals of transposers 32 and selectively couples the signals from one of the transposers onto the data bus 23. Similarly, the multiplexer 41 receives data signals from the output terminals of transposer 33 and selectively couples the signals from one of the transposers onto the bus 42 for transmission to the auxiliary processor. The structure and operation of transposers 32, input multiplexers 34, pointer registers 35 and output multiplexers 40 and 41 are generally described in the aforementioned Bromley and Heller, et al., patent applications.

The processing element node 10 also provides a direct (that is, non-transposing) path between the data bus 23 and the auxiliary processor 30. It will be appreciated that the transposer module 31 facilitates the transposition of data transmitted from the memory 22 in processor format, which would be transmitted serially over separate lines of the data bus 23, into parallel format for processing by the auxiliary processor 30. If the data is stored in memory 22 in slice format, transposition is not required. In addition, the transposer module 31 receives processed data from the auxiliary processor 30 and, if it is required that it be stored in the memory 22 in processor format, transposes the data for transmission serially over predetermined lines of the data bus 23. If the processed data from the auxiliary processor 30 is to be stored in the memory 22 in slice format, the data may be transmitted by the auxiliary processor 30 to the memory 22 over the non-transposing path.

The transposer module 31 also includes several components which provide the IND MEM ADRS indirect memory address signals which are coupled to the multiplexer 26. This indirect memory addressing capability permits the processing element nodes 10 to independently provide memory addresses to their own memories 22, so that the addressed locations in the respective memories 22 may differ as among the various processing element nodes 10. The transposer module 31 includes an adder 42 which produces the IND MEM ADRS indirect memory address signals in response to BASE signals provided from a base register 43 and OFFSET signals from multiplexer 41. Thus, the OFFSET signals may correspond to the outputs of one of the transposers 32 or the signals on the data bus 23. The base register 43 and maximum offset register 45 are separately provided with values provided over bus 23 in response to appropriate XPOSER CTRL transposer control signals from the sequencer 15.

The compare circuit 46 determines whether the binary-encoded value of the signals from multiplexer 41 exceeds the binary-encoded value of the MAX OFFSET signals from the register 45, to provide a COMP OK compare status signal to indicate whether the offset provided by the OFFSET signals is less than the maximum offset identified by the maximum offset register 45. If the COMP OK compare status signal indicates that the value of the OFFSET signal exceeds the maximum offset value contained in the maximum offset register 45, the sequencer 46 may inhibit storage in the location identified by the IND MEM ADRS indirect memory address signals.

With this background, the invention will be described in connection with FIGS. 3 through 5B. The invention provides a system and method for generating a program for use by the host 16 and sequencer 15 to control the operations of the array 10 to facilitate changes in the assignment of data items forming, for example, a data object such as an array, as among the processing elements. Each data item is in a storage location in memory, which corresponds to the number of bit locations required to store each item, with each location being identified by an address. The address may actually be a displacement that is relative to a base address for the data object. In any case, the address for each data item, within the data object, comprises a series of address bits having a form "$a_M, \ldots, a_0$," where a selected number of high-order "global" bits, "$a_M, \ldots, a_N$," identify the processing element node, a selected number of intermediate-order "processor identification" bits, "$a_{N-1}, \ldots, a_P$," identify a processor within the processing element node, and the remaining, low-order "local" bits, "$a_{P-1}, \ldots, a_0$," identify the particular storage location or the series of storage locations in the memory, in the processor view of memory, which stores the data item. More specifically, the local address bits only identify offsets, from the base storage location for the data object, to storage locations for storing the data items in the object. In that case, the local address bits are not all of the address bits required to completely address the memory associated with a processing element.

In rearranging the data assignments, selected ones of the address bits are rearranged. If, for example, if the data object is viewed as a matrix, the data items of successive columns may be assigned to processors having successive identifications, and the data items of successive rows within a column may be assigned to successive storage locations in the respective processors' memories. In that case the resulting interchange of row and column assignments will reflect an interchange of the low order address bits with the high-order and intermediate-order bits. Thus, if the original assignment is reflected by an address having the form "$a_M, \ldots, a_N, a_{N-1}, \ldots, a_P, a_{P-1}, \ldots, a_0$," the global and node address bits "$a_M, \ldots, a_N, a_{N-1}, \ldots, a_P$," identify the processing element node and processor and, hence, the column identification for a data item, and the local address bits "$a_{P-1}, \ldots, a_0$" identify the offset, from the base location for the data object, to the storage location containing the particular data item and, hence, the row identification for the data item. In that case, a transpose would result in the assignment having an address with the form "$a_{P-1}, \ldots, a_0, a_M, \ldots, a_N, a_{N-1}, \ldots, a_P$," with address bits "$a_{P-1}, \ldots, a_0$" identifying the processing element node and processor and, hence, the column identification for a data item, and address bits "$a_M, \ldots, a_N, a_{N-1}, \ldots, a_P$," identifying the offset, from the base location for the data object, to the storage location containing the particular data item and, hence, the row identification for the data item. In the rearrangement, successive data items from each processor will be distributed to successive ones of the identified processors, such that, when the rearrangement is completed, each processor will have one data item from all of the other processors. That is, after the rearrangement, the "i-th" processor will receive the "i-th" data item which had been maintained by all of the processors prior to the rearrangement. In addition, after the rearrangement the sequence of data items in each processor's memory after the rearrangement will correspond to the sequence they were maintained by the processors before the rearrangement.

Other, more complex, data reassignments are also possible, reflecting diverse rearrangements of the address bits. For example, a rearrangement of address bits within the global portion "$a_M, \ldots, a_N$" represents an interchange of data items as among processing elements of diverse processing element nodes. With reference to the above matrix example, such a rearrangement would effectively comprise a rearrangement of columns in the matrix. Similarly, a rearrangement of address bits within the processor identification portion "$a_{N-1}, \ldots, a_P$" represents a reassignment of data items as among processors of a processing element node, with the same reassignment pattern occurring among processors in all of the processing element nodes. With reference to the matrix example, the columns of the matrix would be reassigned as among the various processors, but the reassignment would be as among processors on each node, with the same reassignment taking place on all of the nodes. The reassignment would effectively represent a rearrangement of columns, within each series of columns of the matrix which is assigned to a processing element node, with the same rearrangement occurring within each such series.

In addition, a rearrangement of address bits within the local portion "$a_{P-1}, \ldots, a_0$," represents a reassignment of data items as among storage locations in the memories of all of the processors of all of the processing element nodes, with the same reassignment being performed at all of the processors of all of the nodes. With reference to the matrix example, the rearrangement of address bits in the local portion represents a reassignment of rows of the matrix.

More complex reassignments of data items may be made by rearranging address bits as among high-, intermediate- and low-order portions of the address. For example, a rearrangement of some of the address bits as between the global and processor identification portions represents a reassignment of data items as among the processing elements on different processing element nodes. With reference to the matrix example, such a rearrangement of address bits represents a reassignment of the columns as among the various series of columns assigned to each processing element node.

The rearrangement of address bits as between the local portion and either the global or processor identification portion represents a reassignment of the data items maintained by processing elements as among other processing elements. Continuing with the matrix example, if the rearrangement is between the local portion and the processor identification (that is, intermediate) portion of the address, the rearrangement will enable a reassignment of portions of rows and columns within each processing element node, essentially enabling some portion of the processing elements on each processing element node to transfer a series of data items there among. Similarly, if the rearrangement is between the local portion and the global portion, the rearrangement will enable a reassignment of portions of rows and columns as among processing elements on different processing element nodes. Further complex reassignments of data items may be enabled by more complex reassignments of address bits as among the various global-, processing element node identification-, and local-portions of the address.

The invention provides a mechanism for receiving, as inputs, an initial address bit pattern and a rearranged address bit pattern and for generating, in response, a program identifying a series of operations to be performed by the system, under control of the sequencer 15, using a set of predetermined tools, to reassign the data items among the processing element nodes, processing elements and storage locations within the memories of the processing elements, according to the rearrangement of address bits. In one embodiment several tools are used. One tool, termed herein "AAPC," or "All-to-All Personalized Communication", described in the aforementioned Edelman application, enables a reassignment of data items as among the various processing elements to essentially effect the interchange of address bits as between the local and global address portions.

A second tool, "LST," or "Local Shuffle Transpose," facilitates the rearrangement of address bits as between the processing element node portion and the local portion of the address. The LST tool facilitates such an operation through use of the transposers of each processing element node. With reference to FIG. 2, the transfer of data items from the memory into a transposer in each node, and transfer of data items back from the transposer into the memory, constitutes a reassignment of the data as among the processing elements of a node, which effectively provides a rearrangement of the address bits as between the intermediate (processor identification) portion and the low-order portion. The particular order in which data items are loaded into the transposer, the order in which they are returned from the transposer to memory, and the particular sequencing of the addresses comprising the SEL MEM ADRS selected memory address signals provided to the memory 22 all serve to determines the particular ordering of the address bits in the intermediate-and low-order portions after this operation has completed.

It will be appreciated that a rearrangement of address bits within the low-order portion of the address can be performed by reassignment of data items using two successive LST operations. Alternatively, a rearrangement of low-order address bits can be performed by use of a tool which will be termed herein "LS," for "Local Shuffle," which enables data items from particular words, in "slice" format, to be interchanged. Effectively, in an LS operation, enabled by the LS tool, data is copied from storage locations comprising one slice to another slice, termed a destination slice.

As described above, under some circumstances some portion of the addresses may be Gray-encoded, and a further tool may also be provided to convert the addresses from a Gray-encoded form to the non-Gray-encoded form, and to reconvert the addresses from the non-Gray-encoded form to a Gray-encoded form. In one embodiment, a local Gray encoding and decoding tool operates on the low-order portion. It will be appreciated that this tool may make use of an LST tool or an LS tool, in which the particular rearrangement of address bits that is performed is fixed according to the particular Gray-encoding and—decoding scheme that is used. If the Gray encoding is of the high-order global address bits, a global Gray encoding and decoding tool may accomplish the conversion or reconversion by enabling processing elements of selected processing element nodes 11 to send data items to processing elements of other processing element nodes in accordance with their respective node identifiers to facilitate conversion or reconversion of the processor element node identifiers between Gray-encoded and non-Gray-encoded form.

Figure 3A:
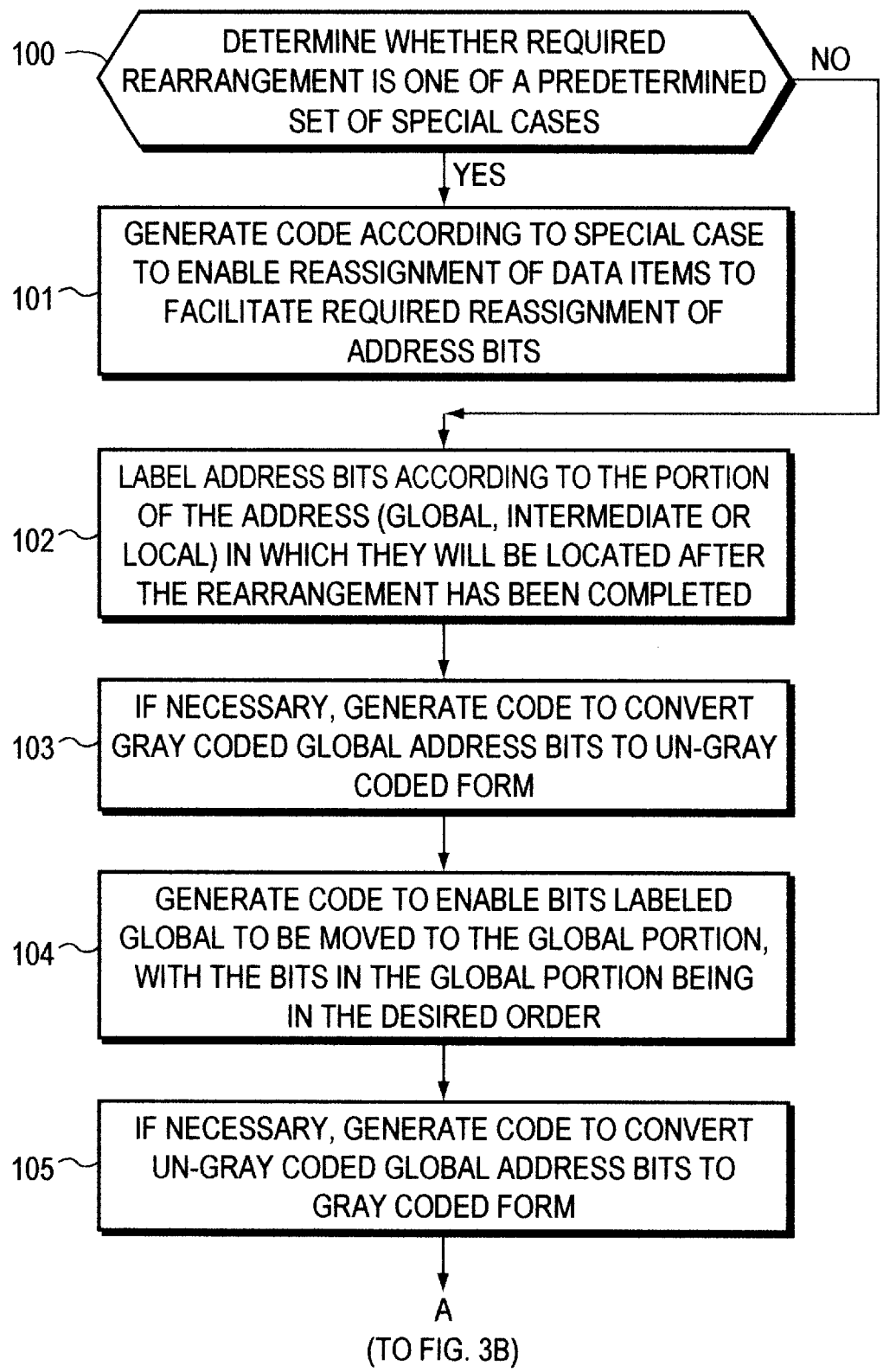
FIG. 3A, 3B, 4, 5A, 5B are flowcharts depicting the operation of the program-generating system.
Figure 3B:
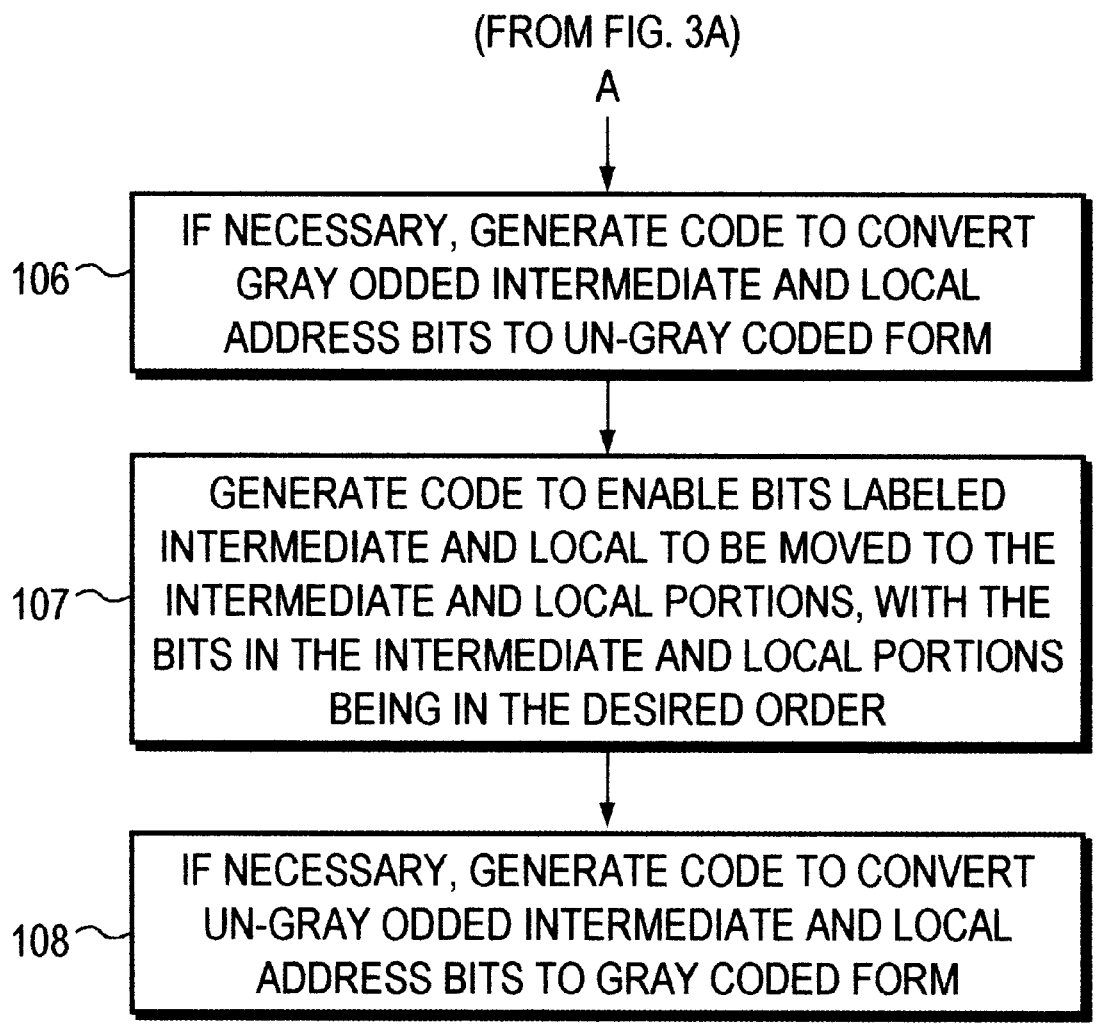

With this background, and with reference to FIG. 3, the program-generating system first determines whether the required rearrangement of data items corresponds to one of a set of predetermined "special cases" (step 100). In one embodiment, certain forms or classes of forms of rearrangements are determined to occur commonly, or represent rearrangements for which optimized code sequences, using the above-described tools or other tools which may be available in the computer system, can be provided to the program-generating system for use in connection with such forms or classes of rearrangements. If the system determines that the required rearrangement is one of the special cases, it sequences to step 101 to generate code using the appropriate code sequence to facilitate rearrangement of the address bits.

On the other hand, if the program-generating system determines that the required rearrangement does not correspond to one of the special cases, it proceeds to a sequence, which begins with step 102, to generate code to enable the rearrangement. The operations of generating code for a rearrangement that is not one of the special cases proceed in three general phases. In a first phase, the arrangement first labels the address bits $a_i$ ("i" being an integer between "M" and "O") of the original address according to the particular portion in which they will be located at the end of the rearrangement operation (step 102). That is, each of the address bits will be associated with a "global," "intermediate" or "local" label to identify the particular global, intermediate or local portion in which it will be located after the rearrangement operation. The arrangement may also identify the particular index which the bit will have within the respective portion at the end of the rearrangement operation.

Following the labelling step 102, the arrangement performs a series of operations to rearrange the bits labeled in step 102 as global bits, so that they are all in the global portion and in the correct order. If the global portion is in Gray-encoded form, the arrangement first generates code to enable it to be converted to non-Gray encoded form (step 103). Thereafter, or immediately after step 102 if the global portion of the address bits are not in Gray-encoded form, the arrangement generates code to enable reassignment of data items so as to effect a rearrangement of address bits that are labeled "global," effectively moving them to the global portion, with the address bits being in the desired order following the rearrangement operation (step 104). The operations performed by the program-generating system in step 104 will be described below in detail in connection with FIG. 4. If the global bits are to be in Gray-encoded form following the rearrangement, the program-generating system then generates code to convert the non-Gray encoded global address bits to Gray-encoded form (step 105). At the end of step 105, the program-generating system will have generated a program to reassign data items among the processing elements so that the address bits labeled "global" will be in the desired rearranged form.

Following step 105, the program-generating system generates code to enable the reassignment of data items among the processing elements so that the address bits labeled "intermediate" and "local" will also be in the desired rearranged form. Initially, if the intermediate and local portions are in Gray-encoded form, the arrangement first generates code to enable them to be converted to non-Gray encoded form (step 106). Thereafter, or immediately after step 105 if the intermediate and local portions of the address bits are not in Gray-encoded form, the arrangement generates code to enable bits that are labeled "intermediate" and "local" to be moved to the respective intermediate and local portions with the address bits being in the desired order following the rearrangement operation (step 107). The operations performed by the program-generating system in step 107 will be described below in detail in connection with FIGS. 5A and 5B. If the intermediate and local bits are to be in Gray-encoded form following the rearrangement, the program-generating system then generates code to convert the non-Gray encoded intermediate and local address bits to Gray-encoded form (step 108). At the end of step 108, the program-generating system will have generated a program to reassign data items among the processing elements so that all of the address bits will be in the desired rearranged form.

While the program-generating system has been described in step 100 and 101 as having available previously-generated code sequences for use in particular identified special cases, it will be appreciated that the system could instead begin with step 102 and generate code to enable such a rearrangement using the sequence of operations described in steps 102 through 108. However, using such previously-generated code sequences in particular identified special cases can facilitate use of certain optimizations which might not otherwise be performed in the code which would be generated in connection with steps 102 through 108. As noted above, FIG. 4 details the operations performed by the program-generating arrangement in connection with step 104, in particular, generating code to enable bits that are labeled "global" to be moved to the globel portion, with the address bits being in the desired order following the rearrangement operation. It will be appreciated that some of the bits labeled "global" may be initially distributed throughout the global, intermediate and local portions. In addition, it will be appreciated that the "local" tools, that is, the LS (local shuffle) and LST (local shuffle transpose), will generally require much less time to execute than the global AAPC tool, since the local tools will operate to reassign data items within a particular processing element node and processing element, whereas the global tools will operate to transfer data items between processing element nodes. Accordingly, the program-generating system will generate program code to (1) enable a reassignment of data items among processing element nodes and processing elements such as to effect a transfer of address bits labeled "global" from the global portion to the intermediate and local portions, (2) enable a reassignment of data items within processing element nodes and processing elements such as to affect a rearrangement of address bits labeled "global" within the intermediate and local portions to the desired ordering, and (3) enable a reassignment of data items as among the processing element nodes and processing elements such as to effect a transfer of address bits labeled "global" from the intermediate and local portions to the global portion, in the desired ordering within the global portion.

Figure 4:
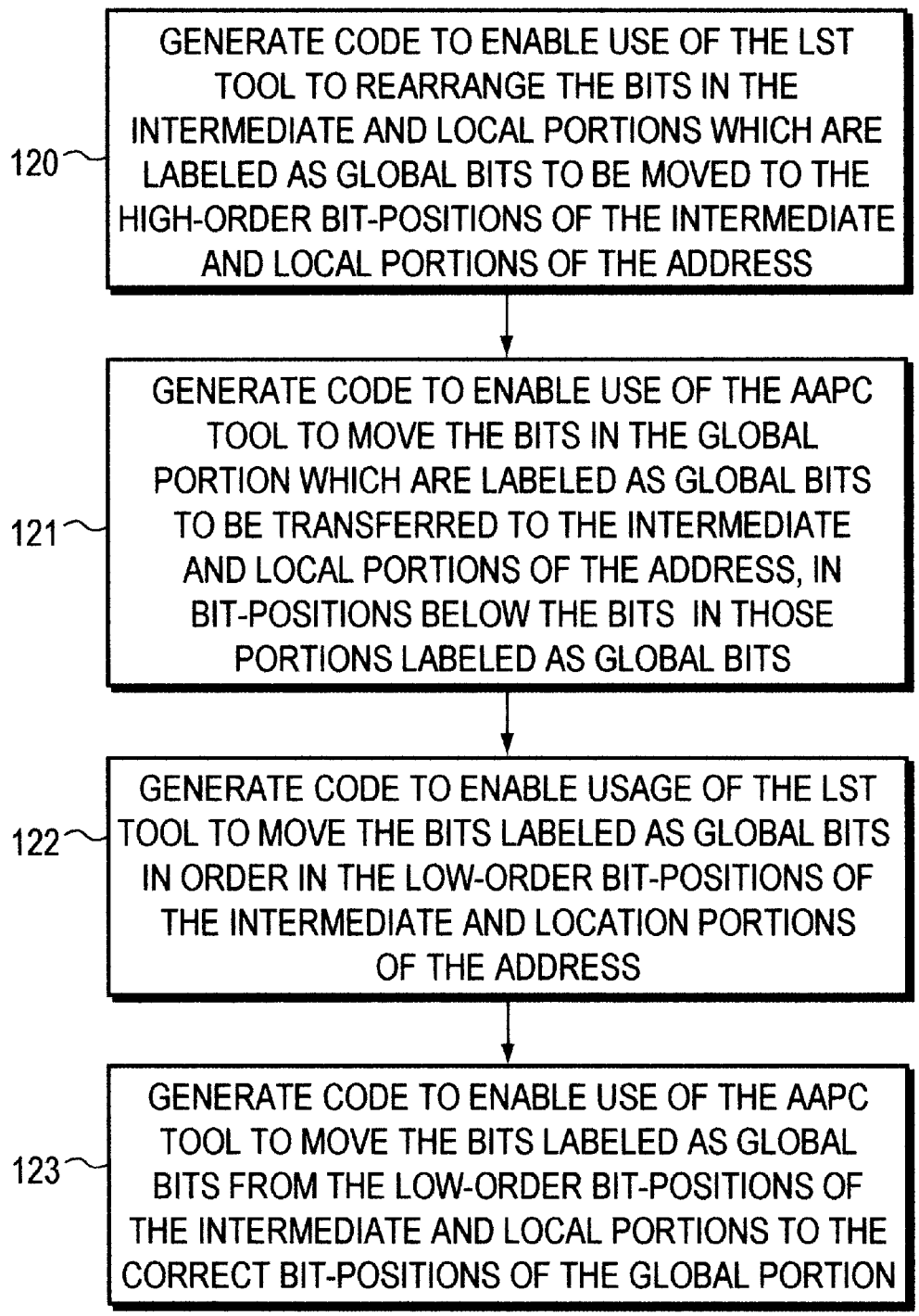

More specifically, and with reference to FIG. 4, the program-generating system initially generates code to enable use of the LST (local shuffle transpose) tool to, in parallel, reassign the data items among processing elements and within processing elements in all of the processing element nodes. The reassignment is such as to effectively rearrange the bits of the intermediate and local portions of the address, so that the bits which are labeled as global bits are moved to the high-order bit positions within the intermediate and local portions of the address (step 120). Thereafter, the program-generating system generates code to enable use of the AAPC tool to reassign the data items among processing element nodes to effect a rearrangement of address bits in the global portion labeled "global" to the intermediate and local portions of the address (step 121). The program-generating system specifically generates the code to enable the AAPC tool to reassign the data so that the address bits labeled "global" from the global portion will be in the low-order bit positions of the intermediate and local portions of the address.

Thereafter, the program-generating system generates code to enable use of the LST tool to enable all of the processing element to, in parallel, reassign the data items among themselves and among respective storage locations within the respective processing element nodes to effectively rearrange the address bits labeled "global" so that they are in the low-order bit positions of the intermediate and local portions, in the desired final order (step 122). The program-generating system then generates code to enable use of the AAPC tool to, in turn, reassign the data items among the processing element nodes, processing elements and memory locations to effect a rearrangement of address bits to move the bits labeled "global" from the low-order bit position of the intermediate and local portions to the appropriate locations in the global portion of the address (step 123). At that point, the global address bits, that is, the bits which are to be in the global portion after the rearrangement operation, will be in the global portion, and in the desired order.

It will be appreciated that the program-generating system may use the the sequence described above in connection with FIG. 4 a number of times in generating code to facilitate rearrangement of the global address bits. The number of times the sequence is used may depend on a number of factors, including, for example, the number of address bits in the global portion, the number of address bits in the local portion, the number of global bits requiring rearrangement, and the rearrangement pattern for the global bits.

Figure 5A:
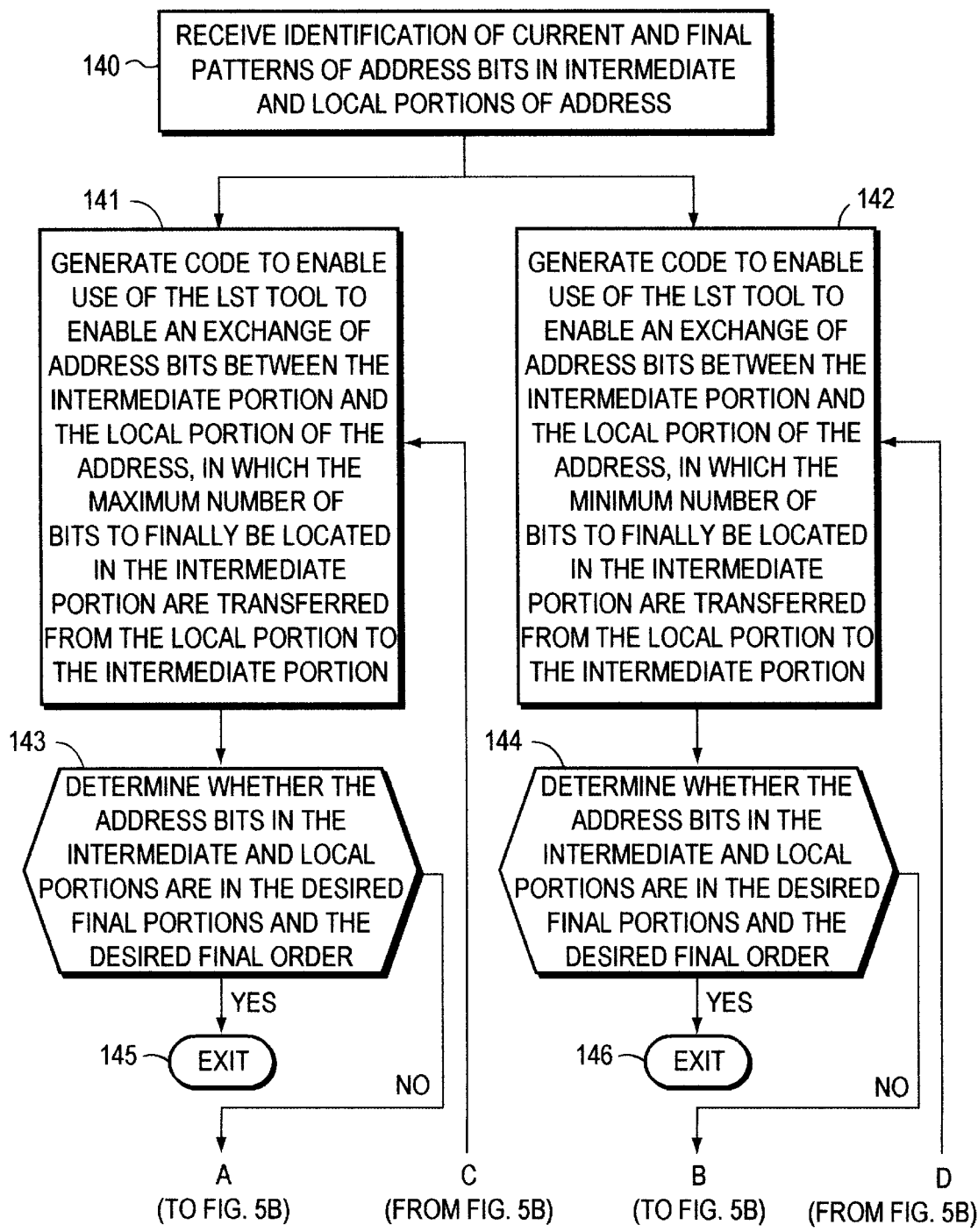
Figure 5B:
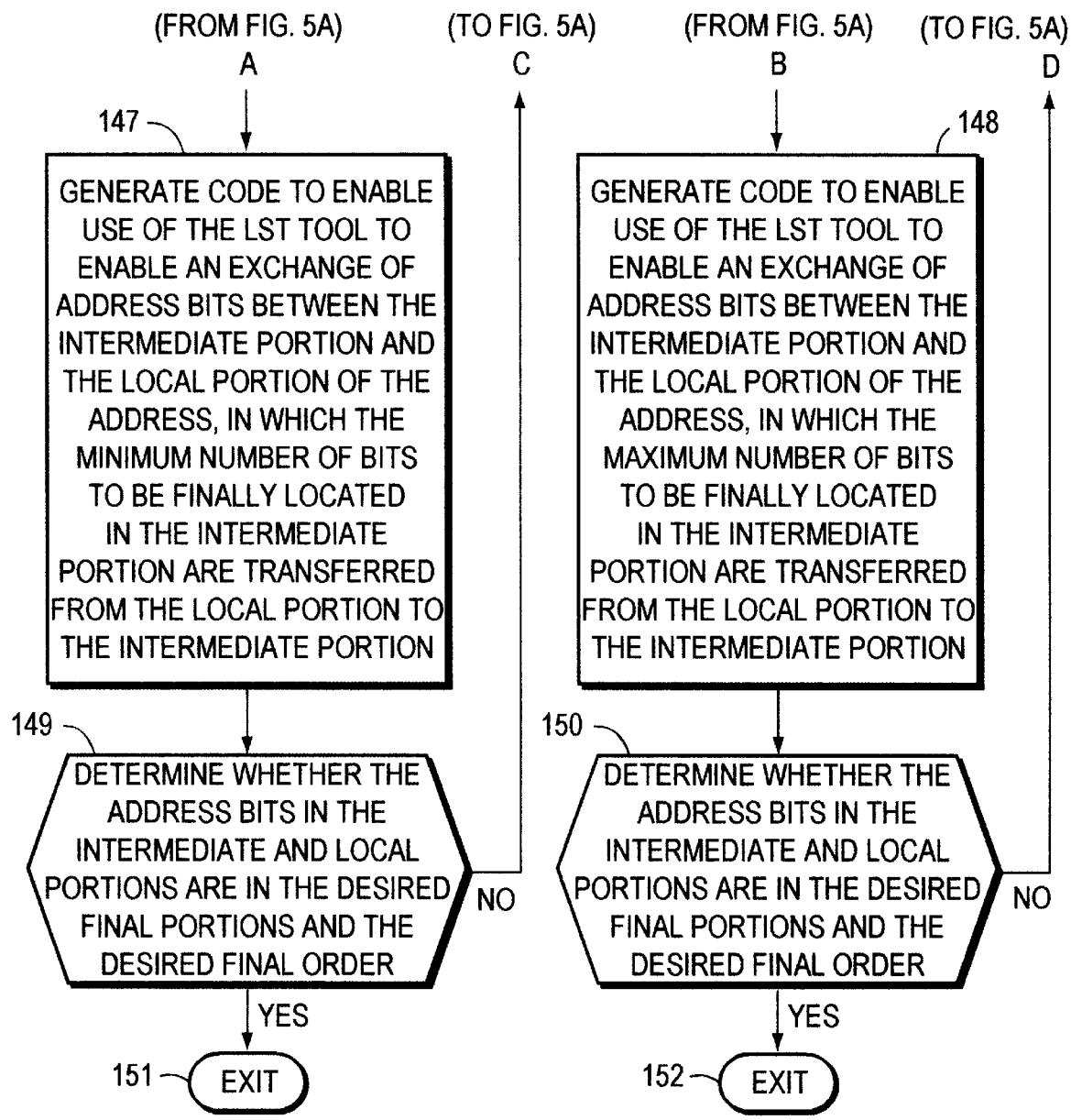

FIGS. 5A and 5B depict the operations of the program-generating system in generating program code to effect a rearrangement of the address bits within the intermediate and local portions of the address. The program-generating system performs these operations in connection with several steps described above in connection with FIGS. 3 and 4. In particular, the program-generating system performs the operations in connection with step 107 (FIG. 3), during which, as described above, the program-generating system generates code to enable bits that are labeled "intermediate" and "local" to be moved to the respective intermediate and local portions with the address bits being in the desired order following the rearrangement operation. In addition, the program-generating system will perform the operations in connection with both steps 120 and 122, in both of which the program-generating system generates code to enable the reassignment of data items to effect the rearrangement of address bits within the intermediate and local portions.

With reference to FIGS. 5A and 5B, the program-generating system generates code to enable use of the LST (local shuffle transpose) tool to perform a reassignment, in parallel, of data items among the processing elements of the processing element nodes and among storage locations in the respective memories of the processing elements, to affect a rearrangement of address bits in the intermediate and local portions of the address. As indicated above, in performing an operation using the LST tool, the computer system effectively exchanges address bits as between the intermediate portion and the local portion, with each application of the LST tool effecting an exchange of all of the address bits of the intermediate portion with a like number of address bits of the local portion. As also indicated above, the bits from the respective intermediate and local portions that are exchanged need not be in the same order, within the portions to which they are moved, after the exchange as before the exchange. In any case, for any particular application of the LST tool, in selecting the bits of the local portion to be moved to the intermediate portion, the program-generating system may select either to move a large number of address bits into the intermediate portion which are to finally be located in the intermediate portion, or to move a small number of address bits into the intermediate portion, during application of the LST tool.

In one particular embodiment, a strategy for application of the LST tool is selected such that the LST tool is applied alternatingly (1) to facilitate the moving of a large number address bits from the local portion which are to be finally located in the intermediate portion, and (2) to facilitate the moving of a small number of address bits from the local portion which are to be finally located in the intermediate portion. It will be appreciated that this will, over a series of iterations, tend to reassign data items so as to increasingly aggregate address bits which are to be finally located in the intermediate portion, as well as to aggregate address bits which are to be finally located in the local portion, alternatingly in one or the other of the intermediate and local portions. In that embodiment, one issue with respect to use of the strategy is whether to begin by using the LST tool to facilitate the moving of a large number address bits from the local portion which are to be finally located in the intermediate portion (item 1 above), or to facilitate the moving of a small number of address bits from the local portion which are to be finally located in the intermediate portion (item 2 above). Rather than attempt to determine a priori which of these two strategies would result in the least number of applications of the LST (local shuffle transpose) tool, the program-generating system generates code for both strategies concurrently. The program-generating system determines from the generated code which strategy uses the fewer number of applications. of the LST tool and enables the code embodying that strategy to be used in performing the intermediate and local bit rearrangement.

With this background, and with reference to FIG. 5A, the program-generating system first obtains the identification of the current and final patterns of the address bits in the intermediate and local portions of the address (step 140). The particular patterns will be determined by the particular step from FIG. 3 or FIG. 4 in which the program-generating system is performing the operations depicted in FIGS. 5A and 5B. If, for example, the program-generating system is performing the operations depicted in FIGS. 5A and 5B in connection with step 107 (FIG. 3), the current and final patterns received in step 140 will identify the bits labeled in step 102 (FIG. 3) as being "intermediate" and "local", to indicate the portions in which they will be located after the rearrangement has been completed. On the other hand, if the program-generating system is performing the operations depicted in FIGS. 5A and 5B in connection with step 120 or step 122 (FIG. 4), the current and final patterns received in step 140 will identify those bits in the intermediate and local portions which were labeled in step 102 as being global bits, on the one hand, or intermediate and local bits, on the other hand. This will provide that the operations performed in connection with FIG. 5A and 5B will facilitate the reassignment of data items so as to move the address bits labeled "global" in the intermediate and local portions are moved to the high-order bit positions (for step 120) or low order bit positions (for step 122) of the intermediate and local portions.

After receiving the current and final address bit patterns, the program-generating system sequences to a series of operations to generate two code sequences for enabling the use of the LST (local shuffle transpose) tool according to the two strategies as described above. The steps performed in connection with each strategy is shown in FIGS. 5A and 5B in two columns, each column being associated with one code sequence so generated. In the left-hand column, in which the steps are identified by odd-numbered reference numerals, the program-generating system generates a code sequence according to the strategy of performing the exchange of bits between the intermediate and local portions beginning with the movement of a maximal number of bits from the local portion which are to finally be located in the intermediate portion to the intermediate portion. On the other hand, in the right-hand column, in which the steps are identified by even-numbered reference numerals, the program-generating system generates a code sequence according to the strategy of performing the exchange of bits between the intermediate and local portions beginning with the movement of a minimal number of bits from the local portion which are to finally be located in the intermediate portion to the intermediate portion. The program-generating system will, however, perform the steps from the two columns depicted in FIGS. 5A and 5B in interleaved fashion, and will terminate the operations shown in those FIGS. when it determines that one of the code sequences will reassign data items such that all the address bits are in their desired final locations.

More specifically, after receiving the current and final patterns of address bits (step 140) the program-generating system sequences to a series of steps in the left hand column in which it begins the establishment of a code sequence to generate code to enable use of the LST tool to enable a rearrangement of data items so as to effect an exchange of address bits between the intermediate portion and the local portion. Initially, the program-generating system sequences to the left-hand column, to generate code to enable use of the LST tool such that a maximum number of address bits which are to finally be located in the intermediate portion, are moved to the intermediate portion from the local portion (step 141). The program-generating system then compares the pattern of address bits in the intermediate and local portions resulting from the reassignment of data items enabled by the just-generated code to determine if it corresponds to the final pattern received in step 140 (step 143), and, if so, exits (step 145), with the code sequence which will be provided by the program-generating system being the one program step generated in connection with step 141.

If the program-generating system determines that the code sequence generated in connection with the left-hand column of FIG. 5A does not facilitate the reassignment of data items sufficient to provide a rearrangement of address bits so that the intermediate and local portions are in the required final pattern, it sequences to a corresponding series of steps in the right-hand column. Initially in connection with the right-hand column, the program-generating system generates code to enable use of the LST tool such that a minimum number of address bits which are to finally be located in the intermediate portion, are moved to the intermediate portion from the local portion (step 142). The program-generating generating system then compares the pattern of address bits in the intermediate and local portions resulting from the reassignment of data items enabled by the just-generated code to determine if it corresponds to the final pattern received in step 140 (step 144), and, if so, exits (step 146), with the code sequence which will be provided by the program-generating system being the one program step generated in connection with step 142.

If the program-generating system determines that the code sequence generated in connection with the right-hand column of FIG. 5A does not facilitate the reassignment of data items sufficient to provide a rearrangement of address bits so that the intermediate and local portions are in the required final pattern, it returns to the left-hand column, sequencing to step 147 (FIG. 5B). In step 147, the program-generating system adds to the code sequence generated in step 141, code to enable further use of the LST tool. In the added code, the program-generating system enables the LST tool to be used in connection with the assignment of data items such that a minimum number of address bits which are to finally be located in the intermediate portion, are moved from the local portion to the intermediate portion. It will be appreciated that, since the code generated for the sequence during step 141 was provided to enable a reassignment of data items such that the maximum number of address bits which are to finally be located in the intermediate portion are moved there from the local portion (thereby leaving the minimum number of such bits in the local portion), by providing that the additional code generated in step 147 enables a reassignment of data items so that the minimum number of address bits to be finally located in the intermediate portion are transferred to the intermediate portion. Since the code generated in connection with step 147 effectively enables the return of the address bits to the local portion that would be transferred to the intermediate portion in by the code generated in step 141, the sequence of code generated in sin reassignments of data items suchs in reassignments of data items such that an increase in the number of address bits which are to be finally located in the intermediate portion are located in the local portion.

Following step 147, the program-generating system again compares the pattern of address bits in the intermediate and local portions resulting from the reassignment of data items enabled by the just-generated code sequence to determine if it corresponds to the final pattern received in step 140 (step 149), and, if so, exits (step 151). In this case, the code sequence which will be provided by the program-generating system will be the program steps generated in connection with step 141 and 147.

If the program-generating system determines that the code sequence generated in connection with the left-hand column of FIG. 5A does not facilitate the reassignment of data items sufficient to provide a rearrangement of address bits so that the intermediate and local portions are in the required final pattern, it returns to the right-hand column, sequencing to step 148 (FIG. 5B). In step 148, the program-generating system adds to the code sequence generated in step 142, code to enable further use of the LST tool. In the added code, the program-generating system enables the LST tool to be used in connection with the assignment of data items such that a maximum number of address bits which are to finally be located in the intermediate portion, are moved from the local portion to the intermediate portion. It will be appreciated that, since the code generated for the sequence during step 142 was provided to enable a reassignment of data items such that the minimum number of address bits which are to finally be located in the intermediate portion are moved there from the local portion (thereby leaving the maximum number of such bits in the local portion), by providing that the additional code generated in step 148 enables a reassignment of data items so that the maximum number of address bits to be finally located in the intermediate portion are transferred to the intermediate portion. Since the code generated in connection with step 148 effectively enables the return of the address bits to the local portion that would be transferred to the intermediate portion in by the code generated in step 141, the sequence of code generated in steps 142 and 148 results in reassignments of data items such that an increase in the number of address bits which are to be finally located in the intermediate portion are located in the intermediate portion.

Following step 148, the program-generating system again compares the pattern of address bits in the intermediate and local portions resulting from the reassignment of data items enabled by the just-generated code sequence to determine if it corresponds to the final pattern received in step 140 (step 150), and, if so, exits (step 152). In this case, the code sequence which will be provided by the program-generating system being the program steps generated in connection with step 142 and 148.

If the program-generating system determines in step 150 that the code sequence generated in the right-hand column, specifically steps 142 and 148, will not result in the address bits in the intermediate and local portions are in the desired final locations, it returns to the steps 141 and 142 shown on FIG. 5A, and repeats the above-described operations. The program-generating system effectively steps through the code-generating steps 141, 142, 147 and 148, alternating between the left- and right-hand columns. The code sequences generated by the steps 141 and 147, in the left-hand column, and by the steps 142 and 148, in the right-hand column, both tend to enable reassignments of data items such that increasing numbers of the address bits to be finally located in the intermediate portion will be clustered together in one of the two portions. When the program-generating system determines in one of steps 143, 144, 149 or 151 that the code sequence generated to that point for the respective left- or right-hand column is such that the reassignment of data items enabled thereby results in a rearrangement of address bits corresponding to the final pattern established in step 140, it exits and provides the respective left- or right-hand sequence as the required sequence to perform the rearrangement of intermediate and local address bits. By operating in this manner, alternatingly between the left- and right-hand columns, the program-generating system maximizes the likelihood of determining an optimal code sequence, having a minimal number of applications of the LST tool, for reassigning data items within the processing element nodes to effect the required rearrangement of the address bits in the intermediate and local portions of the address.

Returning to steps 100 and 101 of FIG. 3, it will be appreciated that the code sequences which may be generated during those steps by the program-generating system in connection with the selected forms or classes of rearrangements may represent optimizations which are known provide faster reassignments of the data items to accomplish the required rearrangements. The operations described above in connection with steps 102 through 108 of FIG. 3, and in connection with FIGS. 4 and 5A and 5B could provide a suitable code sequence, but the sequence may not provide as fast a reassignment as the optimized sequence determined in step 101.

A specific example will assist in illustrating the operation of the program-generating system. If, for example, the original address bit arrangement is as shown in Arrangement ARR. 1:

GLOBAL
$a_{16}\ a_{15}\ a_{14}\ a_{13}\ a_{12}$   INTERMEDIATE                               [ARR.1]
                    $a_{11}\ a_{10}\ a_9\ a_8\ a_7$        LOCAL
                                                $a_6\ a_5\ a_4\ a_3\ a_2\ a_1$ and the desired final address bit arrangement is as shown in Arrangement ARR. 2:

GLOBAL
$a_3\ a_2\ a_1\ a_7\ a_{14}$   INTERMEDIATE                               [ARR. 2]
                    $a_{16}\ a_8\ a_{12}\ a_{13}$        LOCAL
                                                $a_4\ a_{11}\ a_{10}\ a_9\ a_5\ a_{15}$ assuming the program-generating system determines that the required rearrangement does not correspond to one of the predetermined classes or forms of rearrangement (step 100) it will sequence to step 102 to initially label the address bits as shown in Arrangement ARR. 3:

```
GLOBAL
a_16 a_15 a_14 a_13 a_12    INTERMEDIATE                           [ARR.3]
I L G I I                    a_11 a_10 a_9 a_8 a_7    LOCAL
                             L L L I G                a_6 a_5 a_4 a_3 a_2 a_1
                                                      I L L G G G
``` where the "G" label indicates that the address bit will, in the final arrangement, be located in the global portion, the "I" label indicates that the address bit will, in the final rearrangement, be located in the intermediate portion, and the "L" label indicates that the address bit will, in the final rearrangement, be located in the local portion.

In this case, the address bits are not in Gray-encoded form, so the program-generating system skips step 103. After step 102, the program-generating system sequences to step 104, and performs the operation depicted on FIG. 4 to generate code to enable reassignment of the data items so that all of the address bits labeled "G" are in the global portion, and in the desired final order. As described above in connection with FIG. 4, the program-generating system initially generates code to enable use of the LST (local shuffle transpose) tool to enable rearrangement of the data items to facilitate rearrangement of the address bits such that the address bits in the intermediate and local portions are moved to the high-order positions of the intermediate and local portions (step 120). The particular sequence of operations performed in connection with step 120 are those described in connection with FIGS. 5A and 5B. Referencing only the operations shown in the left-hand column of FIGS. 5A and 5B, the program-generating system initially generates code to enable a reassignment of data items such that a maximum number of address bits to finally be located in the intermediate portion, that is, the address bits labeled "G", are reassigned from the local portion to the intermediate portion. Accordingly, the code generated in step 141 for the first application of the LST tool will enable a reassignment of data items to effect a rearrangement of address bits to that shown in Arrangement ARR. 4:

```
GLOBAL
a_16 a_15 a_14 a_13 a_12    INTERMEDIATE                           [ARR.4]
I L G I I                    a_3 a_2 a_1 a_5 a_4     LOCAL
                             G G G L L                a_6 a_11 a_10 a_9 a_8 a_7
                                                      I L L L I G
```

It will be appreciated that the program-generating system will determine in step 143 that all of the bits in the intermediate and local portions are not in their desired final positions. Accordingly, the program-generating system will (continuing only with the sequence in the left-hand column of FIGS. 5A and 5B) sequence to step 147 to generate code to enable the application of the LST tool to facilitate a reassignment of data items to effect a rearrangement of address bits such that the minimum number of address bits to be located in the intermediate portion (that is, the bit labeled "G") are moved to the intermediate portion. In this case, since the local portion has enough bit positions, that is, five bit positions, which have address bits which are not labeled "G", to accept the five address bits from the intermediate portion, the program-generating system enables the use of the LST tool to facilitate a rearrangement of address bits so that no bits labeled "G" are moved from the local portion to the intermediate portion. In that case, the code generated in step 147 for the second application of the LST tool will enable a reassignment of data items to affect a rearrangement of address bits to that shown in Arrangement ARR. 5:

```
GLOBAL
a_16 a_15 a_14 a_13 a_12    INTERMEDIATE                           [ARR.5]
I L G I I                    a_6 a_11 a_10 a_9 a_6    LOCAL
                             I L L L I                 a_4 a_5 a_3 a_2 a_1 a_7
                                                       L L G G G G
```

Since the address bit arrangement does not yet conform to the desired arrangement, with those address bits labeled "G" in the intermediate and local portions being located in the high-order bit positions of the intermediate and local portions, the program-generating system will, following step 149, return to step 141. Again in step 141, the program-generating system generates code to enable application of the LST tool to enable a reassignment of data items so that the maximum number of address bits labeled "G" in the intermediate and local portions will be located in the high-order bit positions of those portions. In that case, the code generated for the third application of the LST tool will enable a reassignment of data items to affect a rearrangement of address bits to that shown in Arrangement ARR. 6:

```
GLOBAL
a_16 a_15 a_14 a_13 a_12    INTERMEDIATE                           [ARR.6]
I L G I I                    a_3 a_2 a_1 a_7 a_5      LOCAL
                             G G G G L                 a_4 a_6 a_11 a_10 a_9 a_8
                                                       L I L L L I
```

It will be appreciated that in this arrangement of address bits the bits in the intermediate and local portions which are labeled "G" are all in the high-order bit positions of those portions. As this is the desired arrangement, the program-generating system will, following step 141, sequence from step 143 to step 145 and exit the routine shown in FIGS. 5A and 5B, and effectively sequence from step 120 (FIG. 4) to step 121.

In step 121, the program-generating system then generates code to enable use of the AAPC tool to enable a reassignment of data items such that the address bits in the global portion which are labeled "G" will be transferred to the intermediate and local portions, in bit positions below those occupied by similarly-labeled address bits currently in the intermediate and local portions. In particular, the program-generating system generates code to enable application of the AAPC tool to enable reassignment of data items to affect a rearrangement of address bits to that shown in Arrangement ARR. 7:

```
GLOBAL
a_16 a_15 a_8 a_13 a_12     INTERMEDIATE                           [ARR.7]
I L I I I                    a_3 a_2 a_1 a_7 a_3      LOCAL
                             G G G G L                 a_4 a_6 a_11 a_10 a_9 a_14
                                                       L I L L L G
```

Thereafter, the program-generating system sequences to step 122. As described above in connection with step 122, the program-generating system generates code to enable the use of the LST (local shuffle transpose) to enable reassignment of the data items so that the address bits which are labeled "G" in the intermediate and local portions are in the low-order bit positions and in the desired final order. In performing step 122, the program-generating system performs the operations depicted on FIGS. 5A and 5B. In this case, the operations performed by the program-generating system in connection with the left-hand column of FIGS. 5A and 5B will again be described. With reference to FIGS. 5A and 5B, the program-generating system will, after receiving the address bits shown in Arrangement 7 in step 140, sequence to step 141. In step 141, as described above, the program-generating system will generate code to enable use of the LST tool to enable a reassignment of data items so as to rearrangement of address bits within the intermediate and local portions such that the maximum number of bits to finally be located in the intermediate portion will be located in the intermediate portion. In this case, since the address bits labeled "G" are to be located in the low-order bit positions of the intermediate and local portions, most particularly in the local portion, the address bits to be finally located in the intermediate portion are primarily the others, that is, the address bits labeled "I" and "L." Accordingly, the program-generating system generates code to enable use of the LST tool to, in turn, reassign the data items so as to effectively locate the address bits in the local portion in Arrangement 7 which are labeled "I" and "L," that is, address bits $a_4$, $a_6$, $a_{11}$, $a_{10}$, and $a_9$, in the intermediate portion. The result will be a rearrangement of address bits to that shown in Arrangement ARR. 8:

| GLOBAL | | | |
|---|---|---|---|
| $a_{16}\ a_{15}\ a_8\ a_{13}\ a_{12}$ | INTERMEDIATE | | [ARR.8] |
| I L I I I | $a_4\ a_6\ a_{11}\ a_{10}\ a_9$ | LOCAL | |
| | L I L L L | $a_5\ a_3\ a_2\ a_1\ a_7\ a_{14}$ | |
| | | L G G G G G | | which corresponds to the desired final arrangement of address bits for step 122. Accordingly, the program-generating arrangement will sequence from step 143 to step 145 and exit the routine depicted in FIGS. 5A and 5B.

Following step 122, the program-generating system, in step 123 generates code to enable use of the AAPC tool to enable a reassignment of data items such that the address bits labeled "G," all of which are in the low-order bit positions of the intermediate and local portions as shown in Arrangement 8 above, will be located in the global portion. This will be accomplished in one application of the AAPC tool, resulting in a n address bit arrangement shown in Arrangement ARR. 9:

| GLOBAL | | | |
|---|---|---|---|
| $a_3\ a_2\ a_1\ a_7\ a_{14}$ | INTERMEDIATE | | [ARR.9] |
| G G G G G | $a_4\ a_6\ a_{11}\ a_{10}\ a_9$ | LOCAL | |
| | L I L L L | $a_3\ a_{16}\ a_{13}\ a_8\ a_{13}\ a_{12}$ | |
| | | L I L I I I | | in which the address bits in the global portion are in the desired bit locations. Accordingly, the code sequence generated by the program-generating system to this point suffices to provide the desired arrangement of address bits for the global portion. Since in this example, the address bits in the global portion are not to be Gray-encoded, the program-generating system will skip step 105.

Following step 105, the program-generating system steps to the sequence (steps 106 through 108) to generate code to reassign data items so as to effect a rearrangement of the address bits in the intermediate and local portions to the desired final bit positions. Since in this example the address bits in the intermediate and local portions are not Gray-encoded, the program-generating system skips step 106, and sequences directly to step 107. In step 107, the program-generating system performs the operations depicted in FIGS. 5A and 5B. Referring to those FIGS., in step 140 the program-generating system will receive the initial and final address bit patterns, which in this case comprises Arrangement 9 and Arrangement 2, respectively.

Thereafter, the program-generating system sequences to step 141 to begin generating code to enable the necessary reassignments of data items to provide the required rearrangements of address bits in the intermediate and local portions of the address. Referencing again only the operations shown in the left-hand column of FIGS. 5A and 5B, the program-generating system initially generates code to enable a reassignment of data items such that a maximum number of address bits to finally be located in the intermediate portion, that is, the address bits labeled "I", are reassigned from the local portion to the intermediate portion. Accordingly, the code generated in step 141 for the first application of the LST tool will enable a reassignment of data items to effect a rearrangement of address bits to that shown in Arrangement ARR. 10:

| GLOBAL | | | |
|---|---|---|---|
| $a_3\ a_2\ a_1\ a_7\ a_{14}$ | INTERMEDIATE | | [ARR.10] |
| G G G G G | $a_{13}\ a_{16}\ a_8\ a_{13}\ a_{12}$ | LOCAL | |
| | L I I I I | $a_5\ a_4\ a_{11}\ a_{10}\ a_9\ a_6$ | |
| | | L L L L L I | |

It will be appreciated that the program-generating system will determine in step 143 that all of the bits in the intermediate and local portions are not in their desired final positions as shown in Arrangement ARR. 2. Accordingly, the program-generating system will (continuing only with the sequence in the left-hand column of FIGS. 5A and 5B) sequence to step 147 to generate code to enable the application of the LST tool to facilitate a reassignment of data items to effect a rearrangement of address bits such that the minimum number of address bits to be located in the intermediate portion (that is, the bits labeled "I") are moved to the intermediate portion. In this case, since the local portion has enough bit positions, that is, five bit positions, to accept the five address bits from the intermediate portion and which are not labeled "I," the program-generating system enables the use of the LST tool to facilitate a rearrangement of address bits so that no bits labeled "I" are moved from the local portion to the intermediate portion. In that case, the code generated in step 147 for the second application of the LST tool will enable a reassignment of data items to affect a rearrangement of address bits to that shown in Arrangement ARR. 11:

| GLOBAL | | | |
|---|---|---|---|
| $a_3\ a_2\ a_1\ a_7\ a_{14}$ | INTERMEDIATE | | [ARR.11] |
| G G G G G | $a_5\ a_4\ a_{11}\ a_{10}\ a_9$ | LOCAL | |
| | L L L L L | $a_{15}\ a_{16}\ a_8\ a_{13}\ a_{12}\ a_6$ | |
| | | L I I I I I | |

Since the address bit arrangement does not yet conform to the desired arrangement shown in Arrangement ARR. 2 with all of the address bits labeled "I" in the intermediate portion and those address bits labeled "L" being located in the local portion, the program-generating system will, following step 149, return to step 141. Again in step 141, the program-generating system generates code to enable application of the LST tool to enable a reassignment of data items so that the maximum number of address bits labeled "I" in the local portion will be located in the intermediate portion. In that case, the code generated for the third application of the LST tool will enable a reassignment of data items to affect a rearrangement of address bits to that shown in Arrangement ARR. 12:

| GLOBAL | | | |
|---|---|---|---|
| $a_3\ a_2\ a_1\ a_7\ a_{14}$ | INTERMEDIATE | | [ARR.12] |
| G G G G G | $a_6\ a_{16}\ a_8\ a_{12}\ a_{13}$ | LOCAL | |
| | I I I I I | $a_4\ a_{11}\ a_{10}\ a_9\ a_5\ a_{15}$ | |
| | | L L L L L L | |

It will be appreciated that in this arrangement of address bits, the address bits in the intermediate portion are all labeled "I," the address bits in the local portion are all labeled "L" and all bits are in the desired final bit positions as shown in Arrangement ARR. 2. As this is the desired arrangement, the program-generating system will, following step 141, sequence from step 143 to step 145 and exit the routine shown in FIGS. 5A and 5B.

Returning to FIG. 3, since the address bits in the intermediate and local portions are not to be in Gray-encoded form, the program-generating system skips step 108. The program generated by the program-generating system comprises the set of code described above as being generated at each point in connection with Arrangements ARR. 3 through ARR. 12. This program may be used by the host and sequencer in a conventional way to enable use of the various tools as described above to enable the required reassignments of data items to achieve the described rearrangement of address bits.

It will be appreciated that the program-generating system will find particular utility in connection with reassignments of data items in the form of arrays or matrices in which the data items are organized in a plurality of axes are of a length which is a power of two. This will ensure that all possible encodings of the address bits $a_M, \ldots, a_0$ identify storage locations which store data items belonging to the array or matrix.

It will further be appreciated that the particular choice of local tools, whether the LST (local shuffle transpose) tool or LS (local shuffle) tool, to be enabled by the program-generating system, may be determined, in part, by the particular association between the processing elements and the processing element nodes. For example, if each processing element is effectively a processing element node, transposes within a processing element node may not be necessary, in which case the program-generating system may enable use of the LS tool to perform local reassignments of data items, among storage locations in the respective processing elements.

The program-generating system may comprise a computer system, such as that provided by the host 16 (FIG. 1), suitably programmed to perform the operations described above in connection with FIGS. 3 through 5B. It will be appreciated that the particular form of the programs generated by a program-generating system will be determined by the particular details of the tools whose use a program may enable.

The foregoing description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed as new and desired to be secured by Letters Patent of the United States is:

1. For use in connection with a computer system having a plurality of processing elements, each including a memory, each memory including a plurality of storage locations for storing a data item, each storage location within the computer being identified by an address comprising a plurality of address bits assigned to a corresponding plurality of address bit positions, a selected number of said address bit positions constituting a global portion and others of said address bit positions constituting a local portion, with the address bits in the address bit positions of the global portion of an address identifying a processing element and the address bits in the address bits of the local portion of the address identifying a storage location within the memory of the processing element identified by the address bits in address bit positions of the global portion, a system for generating a program to facilitate use of a predetermined set of tools to effect a reassignment of data items among processing elements and storage location to, in turn, provide a predetermined rearrangement of address bit positions from an initial arrangement of address bit positions to a final arrangement of address bit positions, said system comprising:

A. a global processing portion for generating a global program portion of said program to enable use of said tools to effect a reassignment of data items as among said processing elements to, in turn, effect a rearrangement of address bits in address bit positions from said initial arrangement to an intermediate arrangement in which the address bit positions in the global portion correspond to the global portion of the final arrangement; and B. a local processing portion for generating a local program portion of said program to enable use of said tools to effect a reassignment of data items as among storage locations within said processing elements to, in turn, effect a rearrangement of the address bits in address bit positions in the local portion of the intermediate arrangement to the final arrangement.

2. A system as defined in claim 1 in which said tools include a global/local rearrangement tool and a local rearrangement tool, the global/local rearrangement tool effecting a reassignment of data items among said processing elements to effect a rearrangement of selected address bits between said global portion and said local portion, and the local rearrangement tool effecting a reassignment of data items among storage locations of each processing element to effect a rearrangement of selected address bits within the local portion, the global processing portion including:

A. a global/local interchange portion for inserting into said global program portion a global/local rearrangement program portion to enable use of said global/local rearrangement tool to effect a reassignment of data items among said processing elements so as to effect a rearrangement of address bits which are to be in said global portion in the final arrangement from said global portion to said local portion;

B. a local reassignment means for inserting into said global program portion a local rearrangement program portion to enable use of the local rearrangement tool to effect a reassignment of data items among storage locations of said processing elements so as to effect a rearrangement of address bits in said local portion which are to be rearranged to the global portion in the final arrangement such that those address bits are in the order specified for the final arrangement; and C. a local/global reassignment means for inserting into said global program portion a local/global rearrangement program portion to enable use of the global/local rearrangement tool to effect a reassignment of data items among said processing elements so as to effect a rearrangement of address bits which are to be in the global portion in the final arrangement from said local portion to said global portion.

3. A system as defined in claim 2 in which said local program portion inserts into said local program portion a local rearrangement program portion to enable use of the local rearrangement tool to effect a reassignment of data items among storage locations of said processing elements so as to effect a rearrangement of address bits in said local portion such that those address bits are in the order specified for the final arrangement.

4. A system as defined in claim 1 in which said tools include a local rearrangement tool for effecting a reassignment of data items among storage locations of each processing element to effect a rearrangement of selected address bits within the local portion, the local program portion inserting into said local program portion a local rearrangement program portion to enable use of the local rearrangement tool to effect a reassignment of data items among storage locations of said processing elements so as to effect a rearrangement of address bits in said local portion such that those address bits are in the order specified for the final arrangement.

5. A program-generating system for generating a program for use in connection with a parallel computer system having a plurality of processing elements, each including a memory, each memory including a plurality of storage locations for storing a data item, each storage location within the computer being identified by an address comprising a plurality of address bits assigned to a corresponding plurality of address bit positions, a selected number of said address bit positions constituting a global portion and others of said address bit positions constituting a local portion, with the address bits in the address bit positions of the global portion of an address identifying a processing element and the address bits in the address bits of the local portion of the address identifying a storage location within the memory of the processing element identified by the address bits in address bit positions of the global portion, a system for generating a program to facilitate use of a predetermined set of tools to effect a reassignment of data items among processing elements and storage location to, in turn, provide a predetermined rearrangement of address bit positions from an initial arrangement of address bit positions to a final arrangement of address bit positions, said program-generating system comprising:

A. a computer, and
B. a control arrangement for controlling said computer comprising:
  i. a global processing portion for enabling said computer to generate a global program portion to enable use of said tools by said parallel computer system to effect a reassignment of data items as among said processing elements to, in turn, effect a rearrangement of address bits in address bit positions from said initial arrangement to an intermediate arrangement in which the address bit positions in the global portion correspond to the global portion of the final arrangement; and
  ii. a local processing portion for enabling said computer to generate a local program portion to enable use of said tools by said parallel computer system to effect a reassignment of data items as among storage locations within said processing elements to, in turn, effect a rearrangement of the address bits in address bit positions in the local portion of the intermediate arrangement to the final arrangement.

6. A program-generating system as defined in claim 5 in which said tools include a global/local rearrangement tool and a local rearrangement tool, the global/local rearrangement tool effecting a reassignment of data items among said processing elements to effect a rearrangement of selected address bits between said global portion and said local portion, and the local rearrangement tool effecting a reassignment of data items among storage locations of each processing element to effect a rearrangement of selected address bits within the local portion, the global processing portion including:

A. a global/local interchange portion for enabling said computer to insert into said global program portion a global/local rearrangement program portion to enable use of said global/local rearrangement tool to effect a reassignment of data items among said processing elements so as to effect a rearrangement of address bits which are to be in said global portion in the final arrangement from said global portion to said local portion;

B. a local reassignment means for enabling said computer to insert into said global program portion a local rearrangement program portion to enable use of the local rearrangement tool to effect a reassignment of data items among storage locations of said processing elements so as to effect a rearrangement of address bits in said local portion which are to be rearranged to the global portion in the final arrangement such that those address bits are in the order specified for the final arrangement; and C. a local/global reassignment means for enabling said computer to insert into said global program portion a local/global rearrangement program portion to enable use of the global/local rearrangement tool to effect a reassignment of data items among said processing elements so as to effect a rearrangement of address bits which are to be in the global portion in the final arrangement from said local portion to said global portion.

7. A program-generating system system as defined in claim 6 in which said local program portion enables said computer to insert into said local program portion a local rearrangement program portion to enable use of the local rearrangement tool to effect a reassignment of data items among storage locations of said processing elements so as to effect a rearrangement of address bits in said local portion such that those address bits are in the order specified for the final arrangement.

8. A program-generating system as defined in claim 5 in which said tools include a local rearrangement tool for effecting a reassignment of data items among storage locations of each processing element to effect a rearrangement of selected address bits within the local portion, the local program portion enabling said computer to insert into said local program portion a local rearrangement program portion to enable use of the local rearrangement tool to effect a reassignment of data items among storage locations of said processing elements so as to effect a rearrangement of address bits in said local portion such that those address bits are in the order specified for the final arrangement.

9. A control arrangement for use in connection with a computer in a program-generating system to enable said computer to generate a program for use in connection with a parallel computer system having a plurality of processing elements, each including a memory, each memory including a plurality of storage locations for storing a data item, each storage location within the computer being identified by an address comprising a plurality of address bits assigned to a corresponding plurality of address bit positions, a selected number of said address bit positions constituting a global portion and others of said address bit positions constituting a local portion, with the address bits in the address bit positions of the global portion of an address identifying a processing element and the address bits in the address bits of the local portion of the address identifying a storage location within the memory of the processing element identified by the address bits in address bit positions of the global portion, a system for generating a program to facilitate use of a predetermined set of tools to effect a reassignment of data items among processing elements and storage location to, in turn, provide a predetermined rearrangement of address locations from an initial arrangement of address bit positions to a final arrangement of address bit positions, said control arrangement comprising:

A. a global processing portion for enabling said computer to generate a global program portion to enable use of said tools by said parallel computer system to effect a reassignment of data items as among said processing elements to, in turn, effect a rearrangement of address bits in address bit positions from said initial arrangement to an intermediate arrangement in which the address bit positions in the global portion correspond to the global portion of the final arrangement; and B. a local processing portion for enabling said computer to generate a local program portion to enable use of said tools by said parallel computer system to effect a reassignment of data items as among storage locations within said processing elements to, in turn, effect a rearrangement of the address bits in address bit positions in the local portion of the intermediate arrangement to the final arrangement.

10. A control arrangement as defined in claim 9 in which said tools include a global/local rearrangement tool and a local rearrangement tool, the global/local rearrangement tool effecting a reassignment of data items among said processing elements to effect a rearrangement of selected address bits between said global portion and said local portion, and the local rearrangement tool effecting a reassignment of data items among storage locations of each processing element to effect a rearrangement of selected address bits within the local portion, the global processing portion including:

A. a global/local interchange portion for enabling said computer to insert into said global program portion a global/local rearrangement program portion to enable use of said global/local rearrangement tool to effect a reassignment of data items among said processing elements so as to effect a rearrangement of address bits which are to be in said global portion in the final arrangement from said global portion to said local portion;

B. a local reassignment means for enabling said computer to insert into said global program portion a local rearrangement program portion to enable use of the local rearrangement tool to effect a reassignment of data items among storage locations of said processing elements so as to effect a rearrangement of address bits in said local portion which are to be rearranged to the global portion in the final arrangement such that those address bits are in the order specified for the final arrangement; and C. a local/global reassignment means for enabling said computer to insert into said global program portion a local/global rearrangement program portion to enable use of the global/local rearrangement tool to effect a reassignment of data items among said processing elements so as to effect a rearrangement of address bits which are to be in the global portion in the final arrangement from said local portion to said global portion.

11. A control arrangement as defined in claim 10 in which said local program portion enables said computer to insert into said local program portion a local rearrangement program portion to enable use of the local rearrangement tool to effect a reassignment of data items among storage locations of said processing elements so as to effect a rearrangement of address bits in said local portion such that those address bits are in the order specified for the final arrangement.

12. A control arrangement as defined in claim 9 in which said tools include a local rearrangement tool for effecting a reassignment of data items among storage locations of each processing element to effect a rearrangement of selected address bits within the local portion, the local program portion enabling said computer to insert into said local program portion a local rearrangement program portion to enable use of the local rearrangement tool to effect a reassignment of data items among storage locations of said processing elements so as to effect a rearrangement of address bits in said local portion such that those address bits are in the order specified for the final arrangement.

13. For use in connection with a computer system having a plurality of processing elements, each including a memory, each memory including a plurality of storage locations for storing a data item, each storage location within the computer being identified by an address comprising a plurality of address bits assigned to a corresponding plurality of address bit positions, a selected number of said address bit positions constituting a global portion and others of said address bit positions constituting a local portion, with the address bits in the address bit positions of the global portion of an address identifying a processing element and the address bits in the address bits of the local portion of the address identifying a storage location within the memory of the processing element identified by the address bits in address bit positions of the global portion, a system for generating a program to effect a reassignment of data items among processing elements and storage location to, in turn, provide a predetermined rearrangement of address bit positions from an initial arrangement of address bit positions to a final arrangement of address bit positions, said system comprising:

A. a predetermined set of tools each for enabling said processing elements to perform a reassignment of data items to effect a predetermined rearrangement of address bit positions of addresses for said data items; and B. a processing portion for generating said program to enable use of said tools in a selected order to effect a reassignment of data items as among said processing elements and storage locations to, in turn, effect a rearrangement of address bits in address bit positions from said initial arrangement to said final arrangement.

14. A system as defined in claim 13 in which said processing portion includes:

A. a global processing portion for generating a global program portion to enable use of said tools to effect a reassignment of data items as among said processing elements to, in turn, effect a rearrangement of address bits in address bit positions from said initial arrangement to an intermediate arrangement in which the address bit positions in the global portion correspond to the global portion of the final arrangement; and B. a local processing portion for generating a local program portion to enable use of said tools to effect a reassignment of data items as among storage locations within said processing elements to, in turn, effect a rearrangement of the address bits in address bit positions in the local portion of the intermediate arrangement to the final arrangement.

\* \* \* \* \*